United States Patent
Kurihara et al.

(10) Patent No.: US 9,384,046 B2
(45) Date of Patent: *Jul. 5, 2016

(54) INFORMATION PROCESSING APPARATUS, COMPUTER PRODUCT, AND INFORMATION PROCESSING METHOD FOR MULTI-THREAD PROCESS

(71) Applicant: FUJITSU LIMITED, Kawasaki-shi, Kanagawa (JP)

(72) Inventors: Koji Kurihara, Kawasaki (JP); Koichiro Yamashita, Hachioji (JP); Hiromasa Yamauchi, Kawasaki (JP); Takahisa Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 377 days.

This patent is subject to a terminal disclaimer.

(21) Appl. No.: 13/856,925

(22) Filed: Apr. 4, 2013

(65) Prior Publication Data
US 2013/0227579 A1   Aug. 29, 2013

Related U.S. Application Data

(63) Continuation of application No. PCT/JP2010/067468, filed on Oct. 5, 2010.

(51) Int. Cl.
*G06F 9/52* (2006.01)
*G06F 9/48* (2006.01)

(52) U.S. Cl.
CPC ............. *G06F 9/4881* (2013.01); *G06F 9/52* (2013.01)

(58) Field of Classification Search
None
See application file for complete search history.

(56) References Cited

U.S. PATENT DOCUMENTS

| 6,122,712 | A | 9/2000 | Torii |
| 8,108,659 | B1 * | 1/2012 | Le Grand ..................... 712/225 |
| 2003/0014602 | A1 | 1/2003 | Shibayama et al. |
| 2003/0105927 | A1 * | 6/2003 | Aoki ..................... G06F 9/4425 711/132 |
| 2003/0221085 | A1 * | 11/2003 | Huras .......................... 711/220 |
| 2005/0055490 | A1 * | 3/2005 | Widell et al. .................... 711/1 |

(Continued)

FOREIGN PATENT DOCUMENTS

| JP | 10-116192 A | 5/1998 |
| JP | 2003-030049 A | 1/2003 |

OTHER PUBLICATIONS

Daisuke Mitsugi et al., "A Consideration and Evalution of Thread Partitioning Methods based on Program Structures", IEICE Technical Report, Dec. 9, 2005, vol. 105, No. 487, pp. 25-30.

Jenn-Yuan Tsai et al., "The Superthreaded Architecture: Thread Pipelining with Run-Time Data Dependence Checking and Control Speculation", Proceedings of the 1996 Conference on Parallel Architectures and Compilation Techniques, Oct. 20, 1996, pp. 35-46.

(Continued)

*Primary Examiner* — Abdullah Al Kawsar
(74) *Attorney, Agent, or Firm* — Arent Fox LLP

(57) ABSTRACT

An information processing apparatus includes a computer configured to set respectively a storage location for each value of a common variable among threads of a thread group having write requests to write the values of the common variable of the threads in a given process, from a specific storage location defined in the write requests, to the storage locations respectively set for the threads; store, for each thread of the thread group, a value of the common variable to the storage location set for the thread; and read out in order of execution of the threads of the thread group defined in the given process and when all the threads in the thread group have ended, each value of the common variable stored at the first storing, and in the order of execution, overwrite a value in the specific storage location with each read value of the common variable.

4 Claims, 22 Drawing Sheets

(56) References Cited

U.S. PATENT DOCUMENTS

| | | | |
|---|---|---|---|
| 2006/0161897 A1* | 7/2006 | Biberstein et al. | 717/124 |
| 2007/0124729 A1* | 5/2007 | Ko et al. | 718/100 |
| 2008/0034164 A1* | 2/2008 | Dai et al. | 711/141 |

OTHER PUBLICATIONS

Toshiya Naka et al., "Heiretsu Hai Bijon Graphics System", National Technical Report, Feb. 18, 1993, vol. 39, No. 1, pp. 89-98.

\* cited by examiner

| ADDRESS INFORMATION FIELD 301 | SIZE FIELD 302 | THREAD ID FIELD 303 |
|---|---|---|
| ADDRESS OF COMMON VARIABLE A | 8 | THREAD 1, THREAD 2, THREAD 3 |
| ADDRESS OF COMMON VARIABLE B | 10 | THREAD 1, THREAD 2, THREAD 4 |

300

| PROCESS ID FIELD 401 | THREAD ID FIELD 402 | PRIORITY LEVEL FIELD 403 | OUTPUT AREA FIELD 404 | OUTPUT AREA SETTING VALUE FIELD 405 |
|---|---|---|---|---|
| PROCESS A | THREAD 1 | 1 | | 24 |
| | THREAD 2 | 2 | | 24 |
| | THREAD 3 | 3 | | 11 |
| | THREAD 4 | 4 | | 13 |
| ... | ... | ... | ... | ... |

400

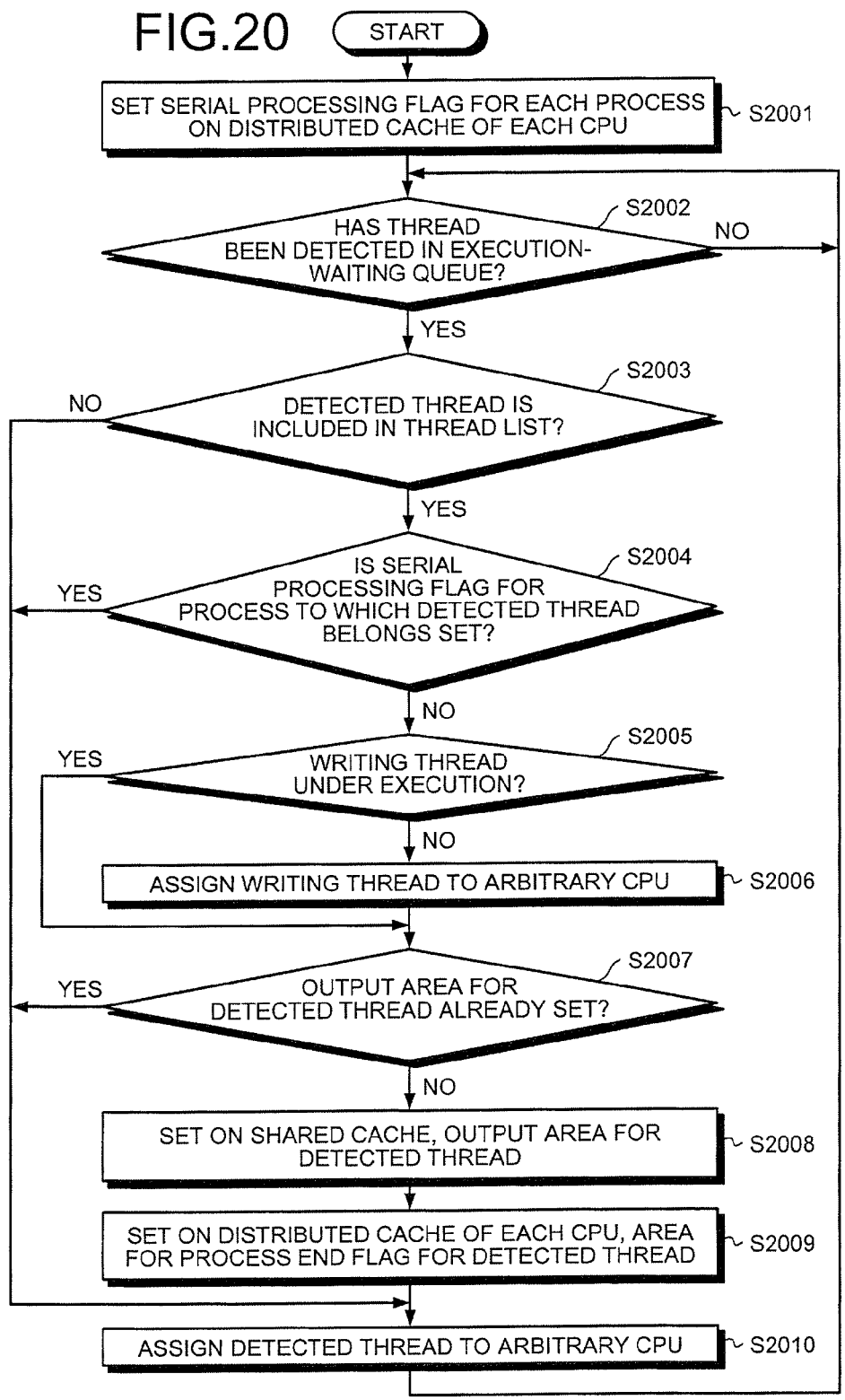

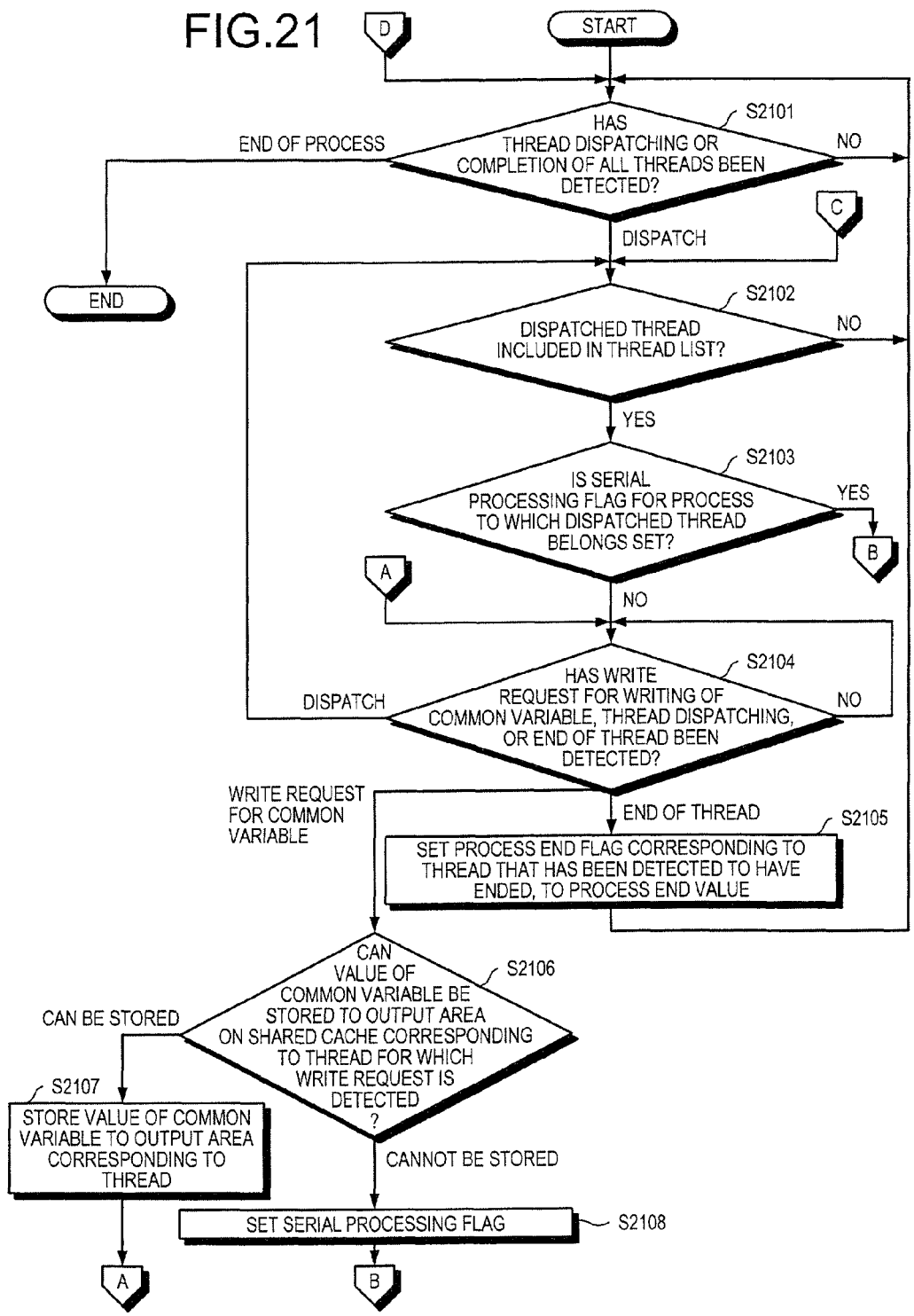

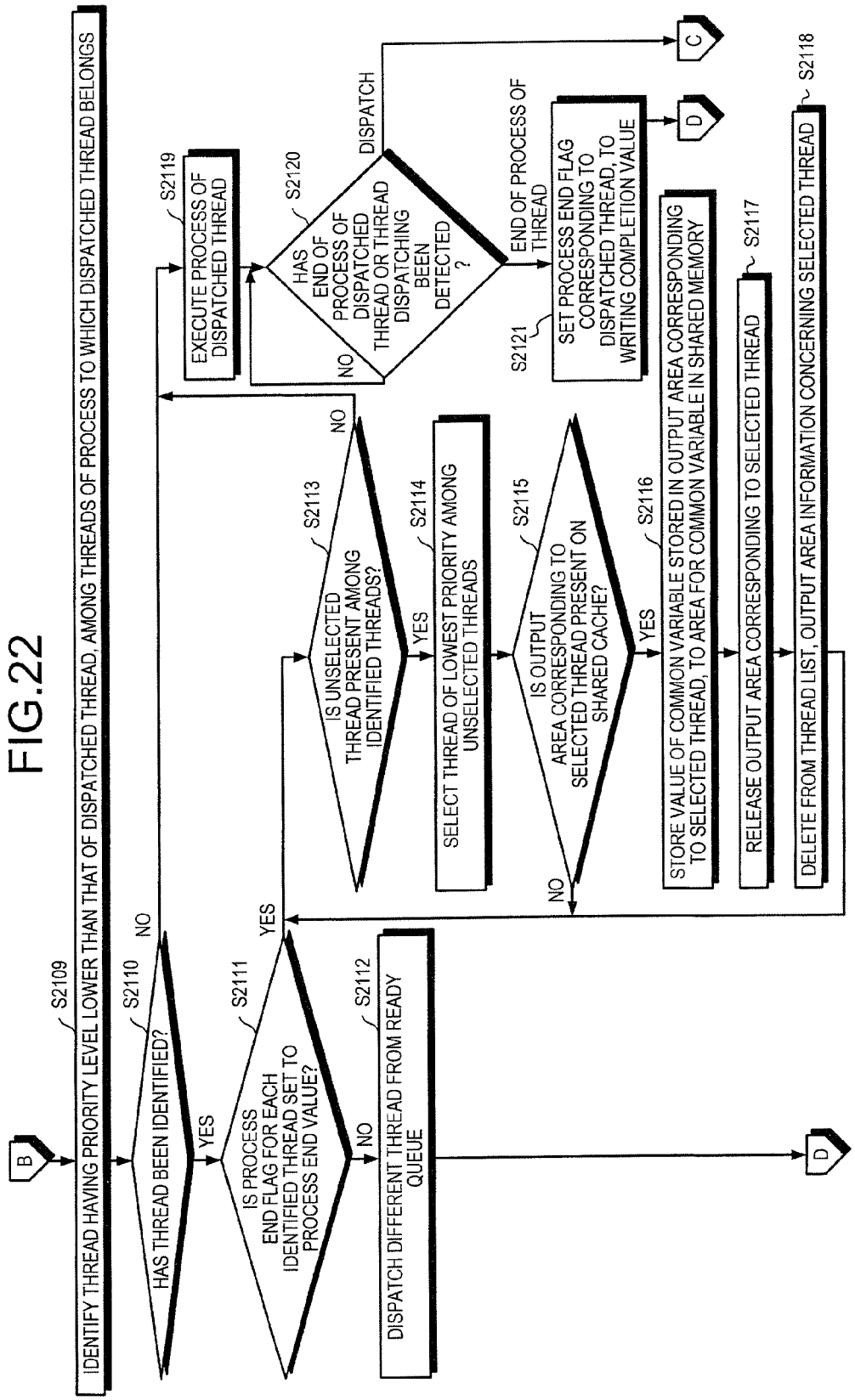

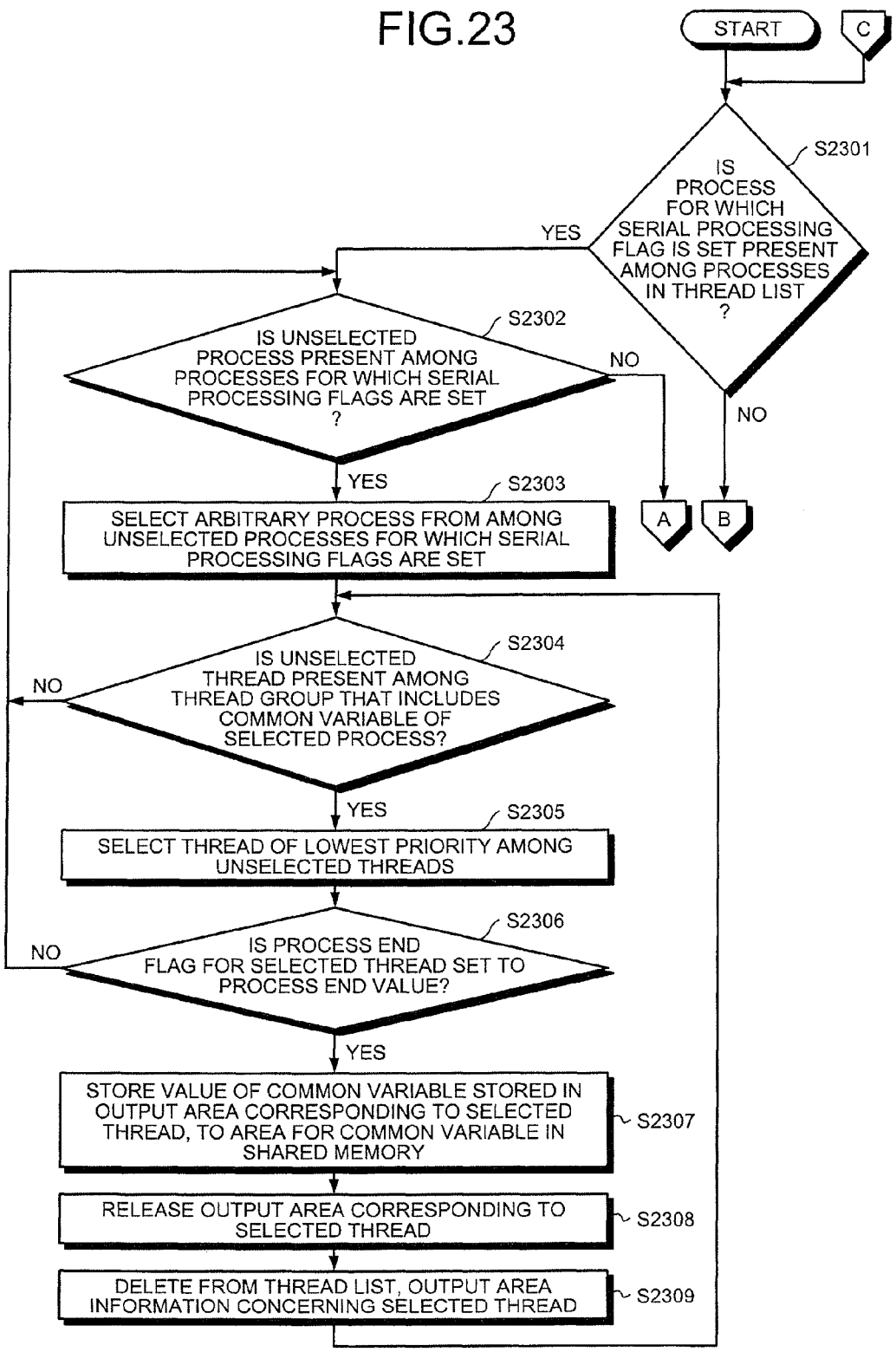

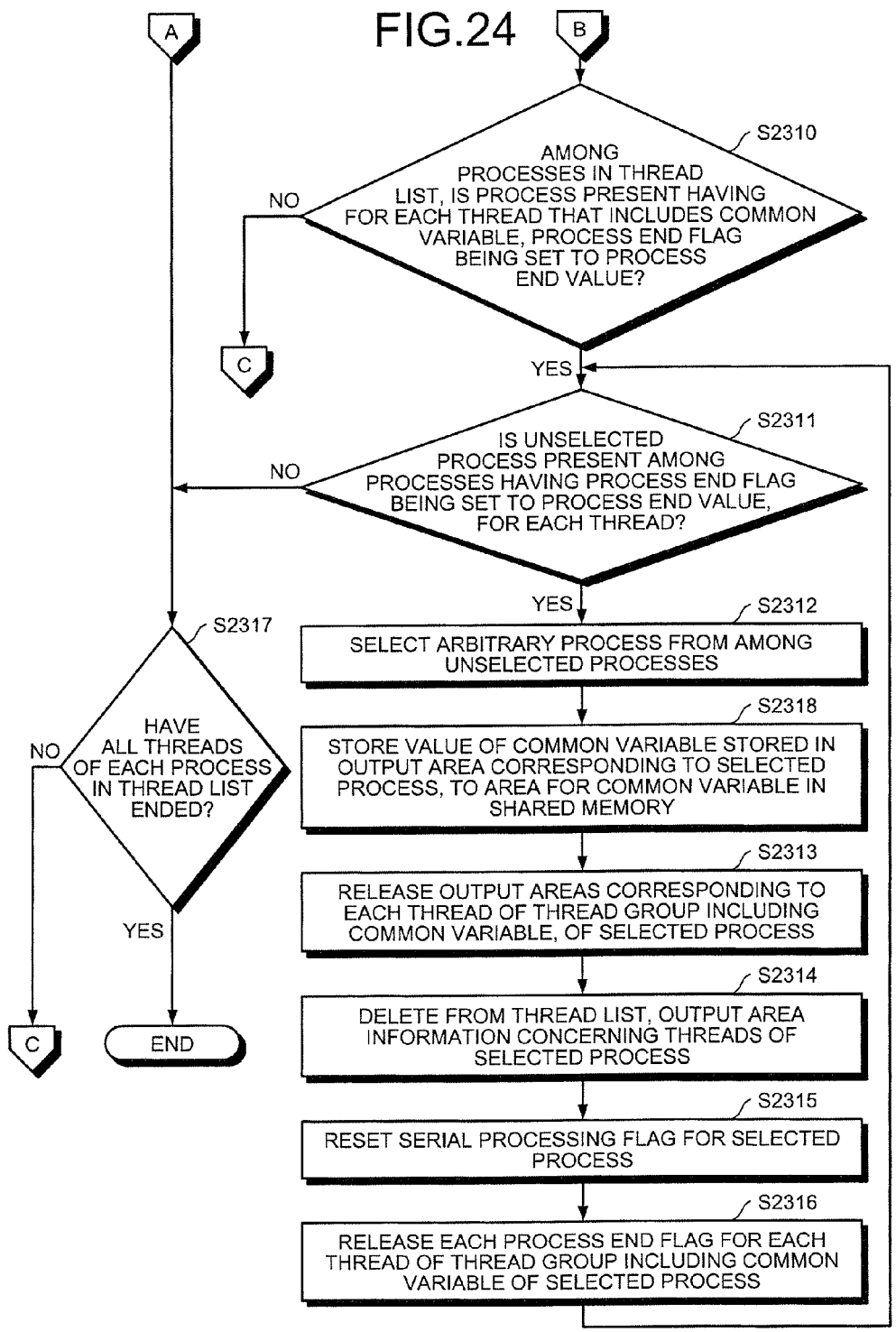

INFORMATION PROCESSING APPARATUS, COMPUTER PRODUCT, AND INFORMATION PROCESSING METHOD FOR MULTI-THREAD PROCESS

CROSS REFERENCE TO RELATED APPLICATIONS

This application is a continuation application of International Application PCT/JP2010/067468, filed on Oct. 5, 2010 and designating the U.S., the entire contents of which are incorporated herein by reference.

FIELD

The embodiment discussed herein is related to an information processing apparatus, computer program, and method.

BACKGROUND

In a multi-thread process, one process is divided into multiple threads and the threads are executed concurrently. In this process, a certain variable is written among the threads. A variable written among the threads is referred to as a common variable.

In a single-core processor system, threads having a common variable are executed through serial processing, thereby preventing a case where the final value of the common variable varies consequent a change in the execution order of the threads.

A banner display process by a browser will be described with regard to a common variable. In the banner display process, data to be displayed is stored in shared memory. When multiple banner display processes are executed, data to be displayed by each banner display process is stored in the memory according to the display order of the banners (Z order) described in a hyper text makeup language (HTML) document. Displayed banners may overlap each other depending on display patterns. To avoid such a case, the banner display process must be executed according to the display order of the banners. Hence, the serial process is performed as described above.

In a shared memory multi-core processor system, a multi-core processor assigns each thread to an arbitrary central processing unit (CPU), where the thread is processed. In the multi-core processor system, each CPU executes threads assigned thereto regardless of the execution status of other CPUs. When executing a thread having a common variable, the CPUs must perform serial processing or synchronization processing of the thread and other threads having the common variable.

The common variable is stored to the cache memory of each CPU. Through communication between CPUs, the common variable is then written to the shared memory, based on the execution status of other threads (see, for example, Japanese Laid-Open Patent Publication Nos. 2003-30049 and H10-116192).

However, serial processing poses a problem of a drop in throughput, and synchronization processing poses a problem of a decline in execution efficiency due to overhead. When the common variable is stored to the cache memory of each CPU in a multi-core processor system, if multiple threads are assigned to the same CPU, execution of the serial processing causes the problem of a drop in throughput. In addition, communication between CPUs creates overhead, leading to the problem of reduced execution efficiency.

SUMMARY

According to an aspect of an embodiment, an information processing apparatus includes a computer configured to set respectively a storage location for each value of a common variable among threads of a thread group having write requests to write the values of the common variable of the threads in a given process, from a specific storage location defined in the write requests, to the storage locations respectively set for the threads; store, for each thread of the thread group, a value of the common variable to the storage location set for the thread; and read out in order of execution of the threads of the thread group defined in the given process and when all the threads in the thread group have ended, each value of the common variable stored at the first storing, and in the order of execution, overwrite a value in the specific storage location with each read value of the common variable.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a flowchart of an information processing procedure by an OS 230;

FIGS. 21 and 22 are flowcharts of an information processing procedure by each OS; and FIGS. 23 and 24 are flowcharts of an information processing procedure by a writing thread.

DESCRIPTION OF EMBODIMENTS

Preferred embodiments of the present invention will be explained with reference to the accompanying drawings.

Figure 1:
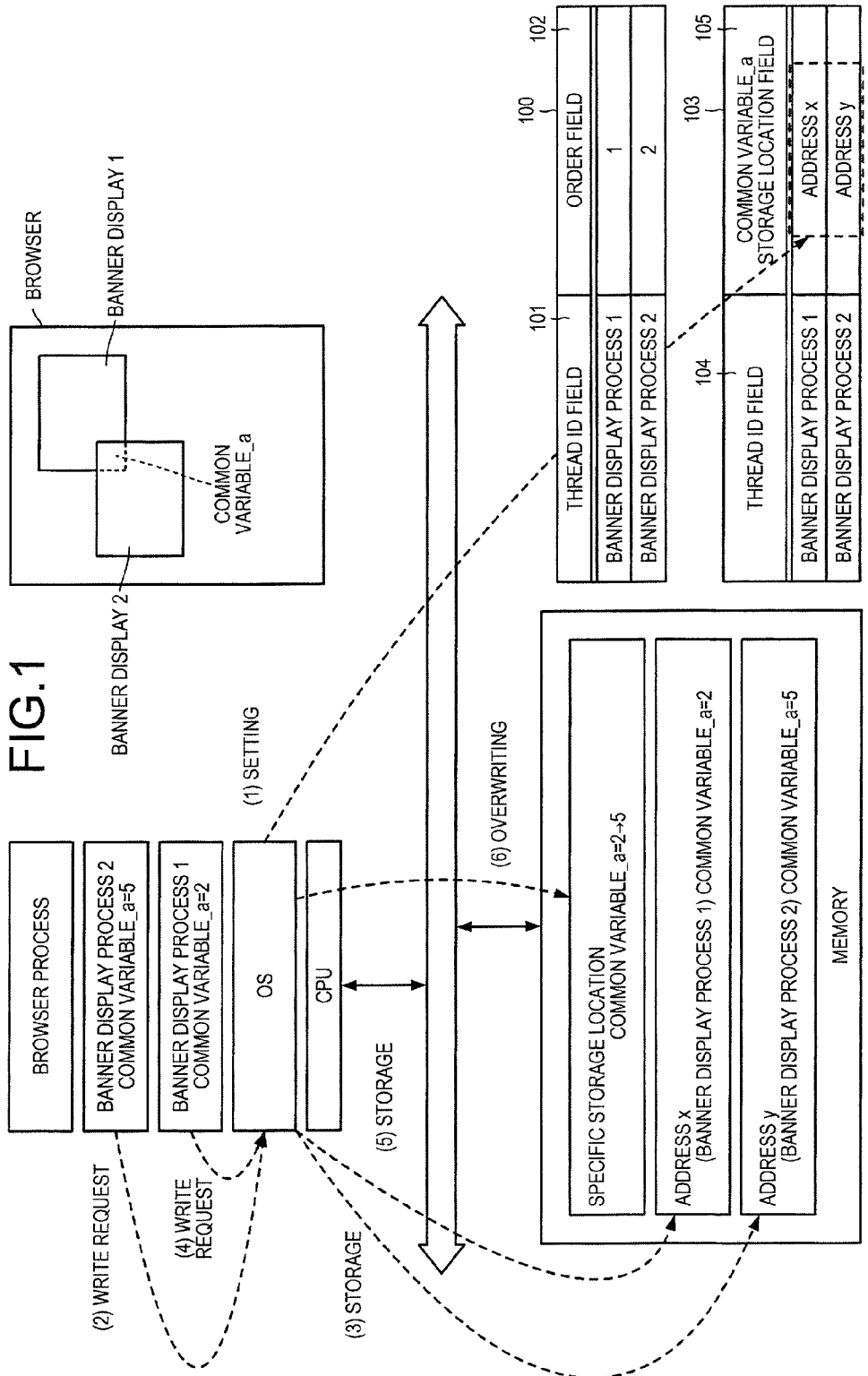
FIG. 1 is an explanatory diagram of one embodiment of the present invention.

FIG. 1 is an explanatory diagram of one embodiment of the present invention. A banner display 1 and a banner display 2 in a browser are taken as an application example. In FIG. 1, a spot where banner displays of the browser overlap is denoted as a common variable_a. A table 100 is information that indicates the order of execution of threads in a browser process. The table 100 has a thread ID field 101 and an order field 102. The thread ID field 101 includes entries of identification information of threads. The order field 102 includes entries of execution orders. The execution order represents information obtained by an analysis of the HTML document by the browser process. A table 103 is information indicating a storage location for a value of the common variable_a for each thread having the common variable_a. The table 103 has a thread ID field 104 and a common variable_a storage location field 105.

When the browser process is started, an OS establishes a storage location for the value of the common variable_a for the banner display process 1 and for the banner display process 2 included in the browser process, the storage location being originally a specific storage location defined by a write request for writing the common variable_a to memory where established storage locations are different for each thread. The OS then (1) enters the established storage locations into the table 103.

When the OS (2) detects a write request that is from the banner display process 2 and for the writing of the common variable_a, the OS (3) stores to the storage location for the value of the common variable_a of the banner display process 2, the value of the common variable_a indicated by the detected write request. Subsequently, when the OS (4) detects a write request that is from the banner display process 1 and for the writing of the common variable_a, the OS (5) stores to the storage location for the value of the common variable_a of the banner display process 1, the value of the common variable_a indicated by the detected write request.

When detecting the end of the banner display process 1 and of the banner display process 2, the OS reads out each value of the common variable_a in the order of numbers entered in the table 103, and (6) overwrites the value of the specific storage location with the read values of the common variable_a. Thus, the value "5" of the common variable_a of the banner display process 2 is entered as the value for the common variable_a.

Even if the process of writing the value of the common variable_a of the banner display process 1 is executed after the process of writing the value of the common variable_a of the banner display process 2, the value of the common variable_a remains the value of the common variable_a of the banner display process 2.

In this embodiment, a multi-core processor system is described as an example of an information processing apparatus. In the multi-core processor system, a multi-core processor is a processor equipped with multiple cores. Provided that multiple cores are provided, the multiple cores may be provided as a single processor equipped with multiple cores or a group of single-core processors in parallel. For simpler explanation, a group of single-core processors in parallel will be described in this embodiment.

In this embodiment, a storage location for each thread is referred to as an output area, and execution order is referred to as priority level. In this embodiment, a thread with a priority level of 1 is a thread of the lowest priority. The greater the value of the priority level, the higher the priority of the thread. Values of the common variable stored in output areas for the threads are stored to the specific storage location in ascending order of thread priority.

Figure 2:
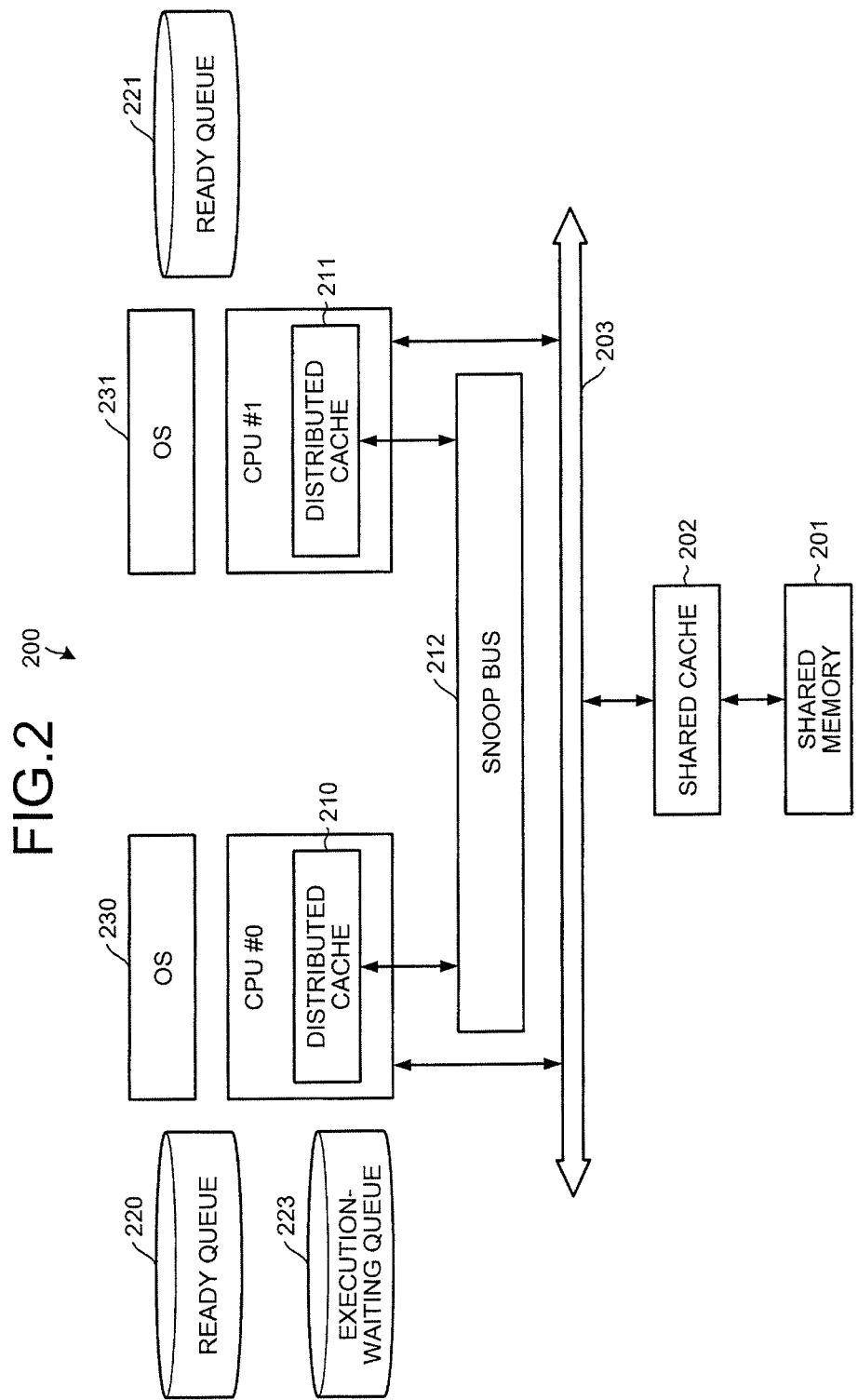
FIG. 2 is a block diagram of hardware of an information processing apparatus.

FIG. 2 is a block diagram of hardware of an information processing apparatus. In FIG. 2, an information processing apparatus 200 includes a CPU #0, a CPU #1, a shared cache 202, and shared memory 201. The CPU #0, the CPU #1, and the shared cache 202 are interconnected through a bus 203.

The CPU #0 has a distributed cache 210, a register, and a core. The CPU #1 has a distributed cache 211, a register, and a core. The CPU #0 executes an OS 230 and supervises overall control of the information apparatus 200. The OS 230 serving as a master OS has a function of determining thread assignment to CPUs, and executes threads assigned to the CPU #0. The CPU #1 runs an OS 231 and executes threads assigned to the OS 231. The OS 231 serving as a slave OS executes threads assigned to the CPU #1.

An execution-waiting queue 223 is a queue of the master OS 230. For example, a thread to be assigned consequent to an issued assignment instruction is placed in the execution-waiting queue 223. The OS 230 takes the thread out of the execution-waiting queue 223 and determines to which CPU the thread is to be assigned.

A ready queue 220 is a queue of the OS 230. Each thread assigned to the CPU #0 and ready for execution is entered into the ready queue 220. A thread in the ready queue 220 is taken out by the OS 230 according to the order of entry or priority level of the thread, and is executed by the CPU #0.

A ready queue 221 is a queue of the OS 231. Each thread assigned to the CPU #1 and ready for execution is entered into the ready queue 221. A thread in the ready queue 221 is taken out by the OS 231 according to the order of entry or priority level of the thread, and is executed by the CPU #1.

The distributed cache 210 is connected to the distributed cache 211 through a snoop bus 212. When one of the distributed caches 210 and 211 detects updating of data shared by the distributed caches 210 and 211, the snoop bus 212 updates the shared data included in the other of the distributed caches 210 and 211.

The shared cache 202 is, for example, a RAM serving as a cache shared by the CPU #0 and CPU #1.

The shared memory 201 has, for example, a read only memory (ROM), a random access memory (RAM), and a flash ROM. For example, the flash ROM stores therein a boot program, the ROM stores therein application software, and the RAM is used as a work area of the CPUs #0 and #1. Programs stored in the shared memory 201 are loaded onto each CPU, where the program causes the CPU to execute processes. The shared memory 201 stores therein, for example, a thread list, common variable information, and a thread management table.

The thread management table, which is not depicted, is, for example, a table indicating to which CPU each thread is assigned. In this embodiment, for a thread including a common variable, a process end flag is set on each distributed cache so that the OS knows whether the process of the thread has ended. This is not the only way of managing processes of threads. For example, the status of a process of each thread may be managed on the thread management table.

Figures 3, 4, 5:
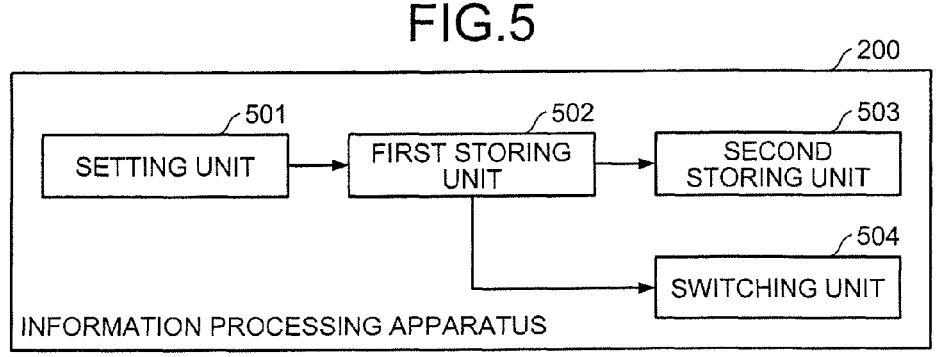
FIG. 3 is an explanatory diagram of an example of common variable information.
FIG. 4 is an explanatory diagram of an example of a thread list.
FIG. 5 is a block diagram of an information processing apparatus 200.

FIG. 3 is an explanatory diagram of an example of common variable information. Common variable information 300 is information concerning a common variable in a process A. The common variable information 300 has an address information field 301, a size field 302, and a thread ID field 303. The address information field 301 holds information of addresses on the shared memory 201, the size field 302 holds information of the sizes of common variables that threads include, and the thread ID field 303 holds identification information of threads including a common variable.

Common variables in the process A include a variable stored at the address of a common variable A on the shared memory 201 and a variable stored at the address of a common variable B on the shared memory 201. The common variable A is a variable common to a thread 1, a thread 2, and a thread 3, and the common variable B is a variable common to the thread 1, the thread 2, and a thread 4.

FIG. 4 is an explanatory diagram of an example of a thread list. A thread list 400 includes a process ID field 401, a thread ID field 402, a priority level field 403, an output area field 404, and an output area setting value field 405.

The process ID field 401 holds identification information of processes having a common variable. The thread ID field 402 holds identification information of each thread of a process of which identification information is held in the process ID field 401.

The priority level field 403 holds the priority level of each thread of which identification information is held in the thread ID field 402.

The output area field 404 holds the address of an output area set on a cache for a common variable of each thread of which identification information is held in the thread ID field 402.

The output area setting value field 405 holds the size of an output area set on the cache for a common variable of each thread of which identification information is held in the thread ID field 402. The size of each output area is large enough to hold the size of the address of the common variable, the size of the common variable, and a common variable writing flag.

In this embodiment, two common variables including the common variable A and the common variable B are described as examples. Each OS determines which of the common variables A and B is already stored in an output area for each thread that includes the common variable. When each thread is assigned, therefore, the OS 230, which performs assignment of the threads, sets a writing flag for the output area for each common variable included in each thread.

It is assumed that a designer of the information processing apparatus 200 makes entries in advance into the process ID field 401, the thread ID field 402, the priority level field 403, and the output area setting value field 405.

For example, in a case of the process A entered in the process ID field 401 in the thread list 400, threads having a common variable in the process A are the threads 1 to 4. This group of threads 1 to 4 defined in the process A are executed in ascending order of thread number, i.e., the thread 1 to thread 4.

FIG. 5 is a block diagram of the information processing apparatus 200. The information processing apparatus 200 includes a setting unit 501, a first storing unit 502, a second storing unit 503, and a switching unit 504. The function of the setting unit 501 is realized by the CPU #0 that executes the OS 230 having an information processing program stored in the shared memory 201. The functions of the first storing unit 502 and the switching unit 504 are realized by each CPU that executes the OS having an information processing program stored in the shared memory 201. The function of the second storing unit 503 is realized by any one of the CPUs that executes a writing thread having an information processing program stored in the shared memory 201.

The setting unit 501 sets a storage location for the value of the common variable, for each thread among a thread group having write requests to write the value of the common variable common to the threads in a given process, from a specific storage location defined by the write requests, to the different storage locations respectively set for the threads. In this embodiment, each storage location for each thread is set in the shared cache 202.

For each thread of the thread group, the first storing unit 502 stores a value of the common variable to a storage location for the thread set by the setting unit 501.

When each thread of the thread group has ended, the second storing unit 503 reads out in the order of execution of threads among the thread group defined in the given process, each value of the common variable stored for each thread by the first storing unit 502, and in the order of execution, overwrites the value in the specific storage location with each read value of the common variable.

If the setting unit 501 has not set a storage location for a given thread among the thread group and write requests to write the values of the common variable of all threads executed before the given thread among the thread group have ended, the value of the common variable for the given thread is stored to the specific storage location.

If the setting unit 501 has not set a storage location for a given thread among the thread group and write requests for writing values of the common variable of all threads executed earlier than the given thread among the thread group have not ended, the value of the common variable for the given thread is not stored to the specific storage location.

If the first storing unit 502 has not stored a value of the common variable for a given thread into the specific storage location, the switching unit 504 switches execution of the given thread to a different thread.

Figure 6:
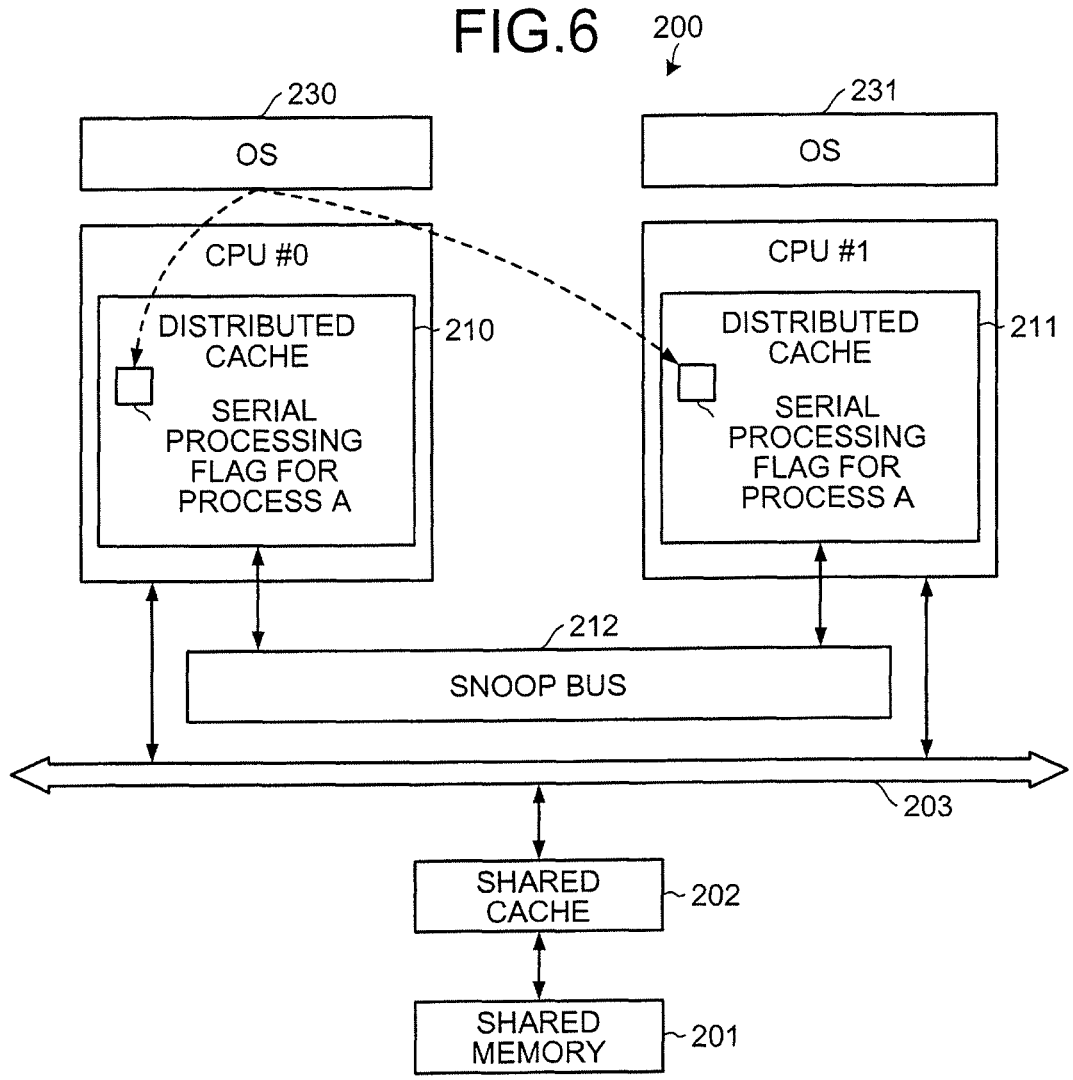
FIG. 6 is an explanatory diagram of an example of setting a serial processing flag.

FIG. 6 is an explanatory diagram of an example of setting a serial processing flag. The OS 230 sets a serial process flag on each distributed cache, for each process indicated in the process ID field 401 of the thread list 400. In FIG. 6, only the serial processing flag for the process A is indicated.

The OS 230 protects an area for a serial processing flag set on each distributed cache. Protecting the area on the distributed cache means setting the area as a swap-out prohibited area where the writing of a different variable is prohibited. The address of the serial processing flag on the distributed cache is stored, for example, in the shared memory 201.

Figure 7:
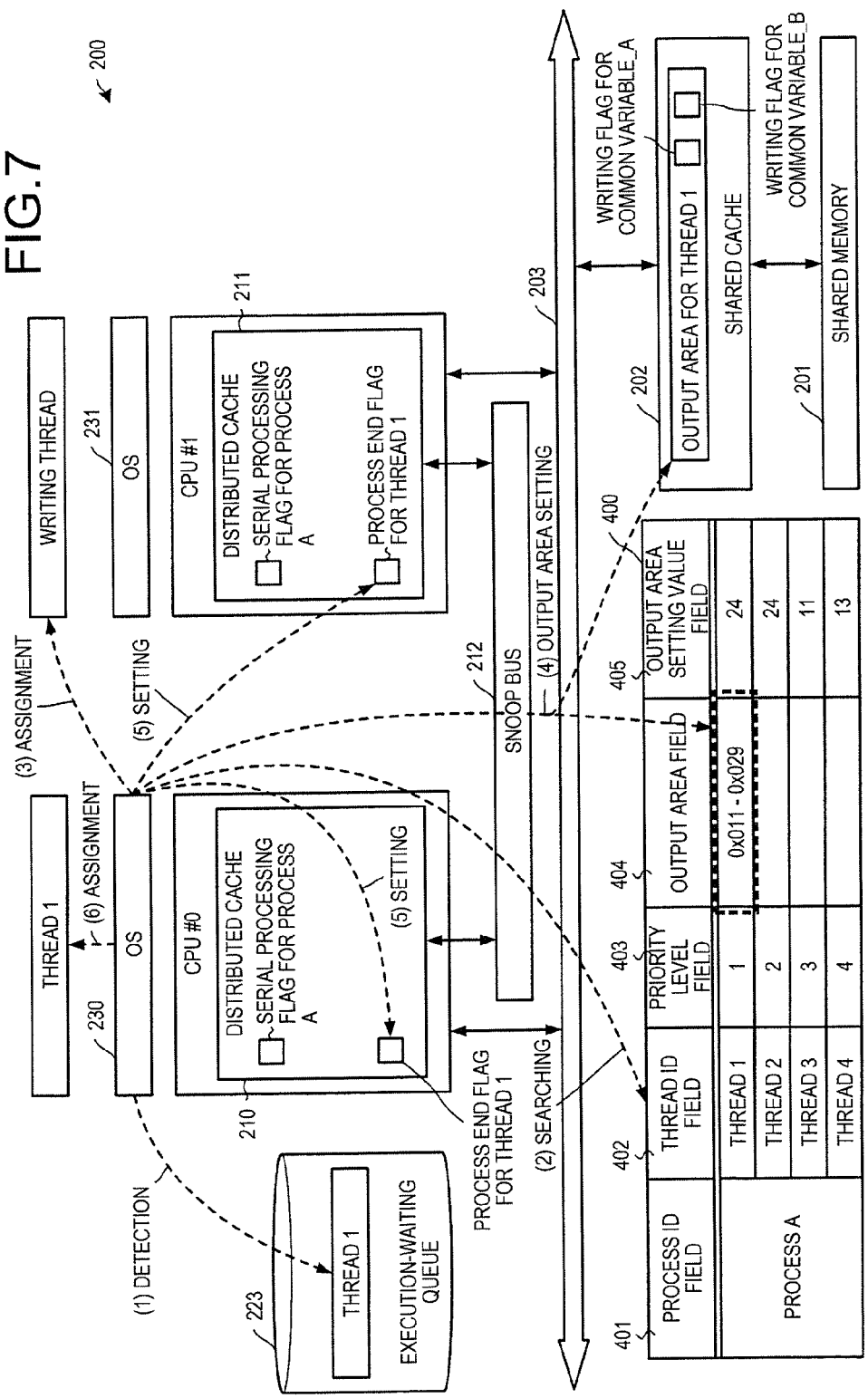
FIG. 7 is an explanatory diagram of an example of assignment of a thread 1.

FIG. 7 is an explanatory diagram of an example of assignment of the thread 1. When the OS 230 (1) detects the thread 1 in the execution-waiting queue 223, the OS 230 (2) searches the thread list 400 for identification information of the thread 1 and identification information of the process A to which the thread 1 belongs and thereby, determines whether the thread 1 is a thread having a common variable. In this example, the thread 1 of the process A is determined to be a thread having a common variable.

The OS 230 then determines whether a serial processing flag for the process A to which the thread 1 belongs is set. Determining that the serial processing flag is not set, the OS 230 determines whether a writing thread is being executed. Determining that a writing thread is not being executed, the OS 230 (3) assigns a writing thread to the CPU #1.

The OS 230 then (4) sets an output area for the thread 1 in an area in the shared cache 202, based on an output area setting value for the thread 1 in the thread list 400. The OS 230 protects the area in the shared cache 202 in which the output area for the thread 1 is set. Protecting the area in the shared cache 202 means, for example, prohibiting the writing of a different variable to the area.

In the output area for the thread 1, the first byte in a rear area is occupied with a writing flag for the common variable B and the second byte in the rear area is occupied with a writing flag for the common variable A. The OS 230 (5) sets an area for a thread process end flag on each distributed cache, and protects the set area. The OS 230 then (6) assigns the thread 1 to the CPU #0.

Figure 8:
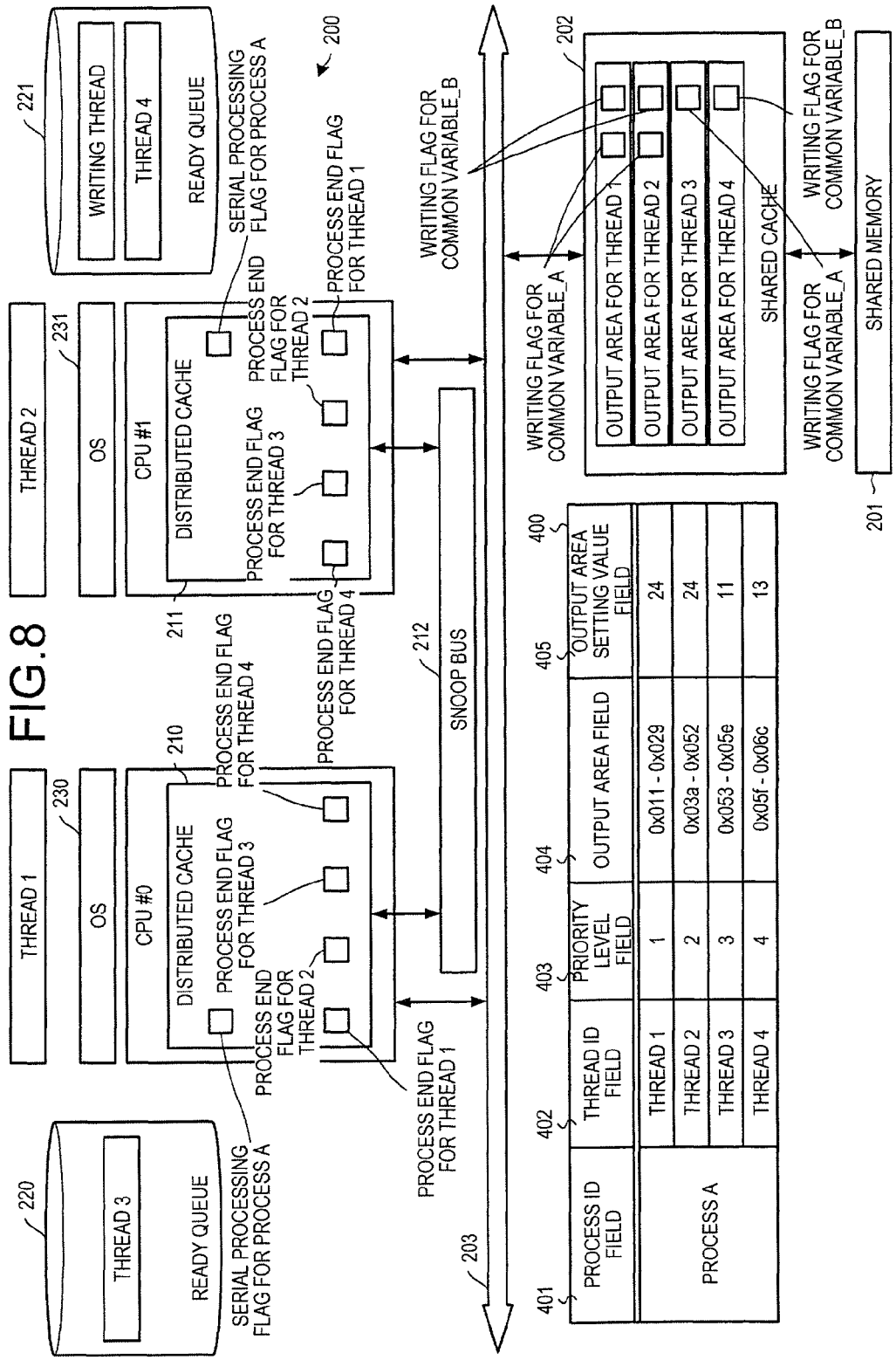
FIG. 8 is an explanatory diagram of an example of assignment of threads 1 to 4.

FIG. 8 is an explanatory diagram of an example of assignment of the threads 1 to 4. In FIG. 8, the threads 1 and 3 are assigned to the CPU #0, and the threads 2 and 4 are assigned to the CPU #1. In the thread list 400, 0x011-0x029 is entered in the output area field 404 for the thread 1, 0x03a-0x052 is entered in the output area field 404 for the thread 2, 0x053-0x05e is entered in the output area field 404 for the thread 3, and 0x05f-0x06c is entered in the output area field 404 for the thread 4.

Figure 9:
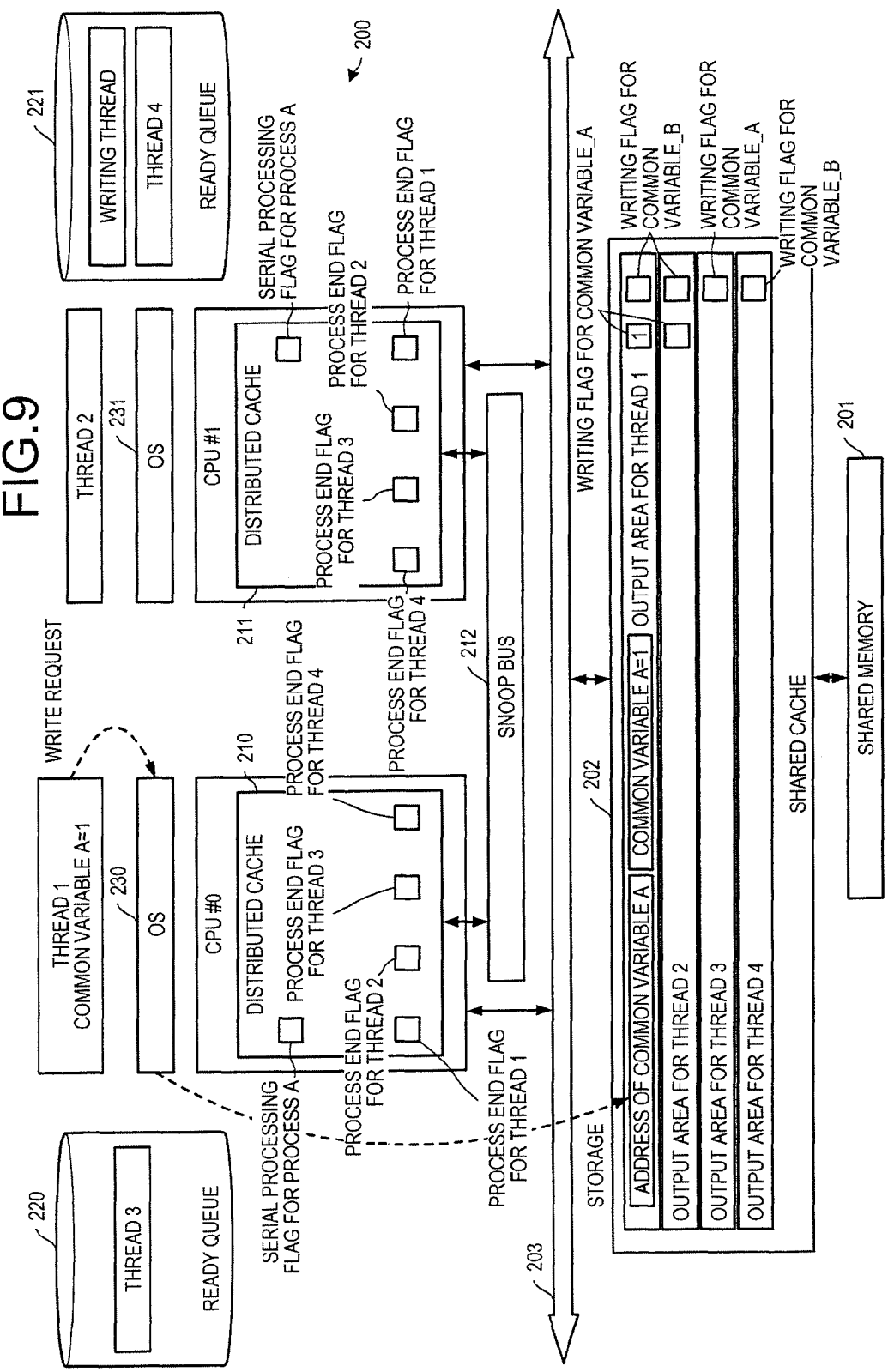
FIG. 9 is an explanatory diagram of an example of detecting a write request that is from the thread 1 and for writing of common variable A.

FIG. 9 is an explanatory diagram of an example of detecting a write request that is from the thread 1 and for writing of the common variable A. The OS 230 detects a write request that is from the thread 1 and for writing of the common variable A. For example, when detecting a write request from the thread 1, the OS 230 determines whether the address of the writing location is an address indicated in the common variable information 300 and thereby, detects a write request for writing of the common variable.

The OS 230 then identifies an output area for the thread 1 indicated in the thread list 400, and stores the address of the common variable A and a value of the common variable A to the identified output area on the shared cache 202. When confirming that no value is set in a writing flag for the common variable B in the output area for the thread 1, the OS 230 sets 1 in a writing flag for the common variable A in the output area for the thread 1. Hence, the OS 230 determines that the address of the common variable A and the value of the common variable A are already stored in the header part of the output area for the thread 1.

Figure 10:
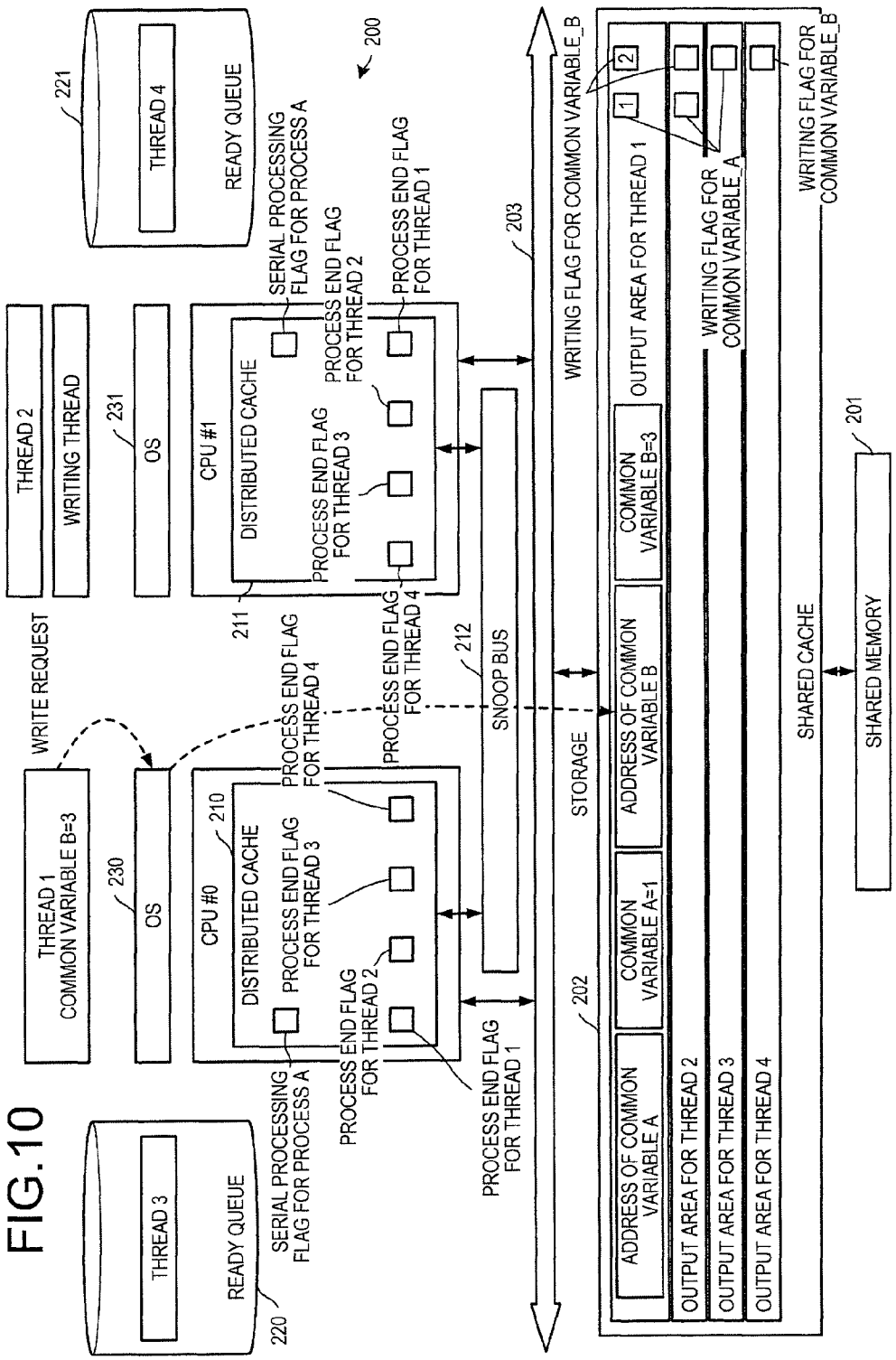
FIG. 10 is an explanatory diagram of an example of detecting a write request that is from the thread 1 and for writing of common variable B.

FIG. 10 is an explanatory diagram of an example of detecting a write request that is from the thread 1 and for writing of the common variable B. The OS 230 detects a write request that is from the thread 1 and for writing of the common variable B. The OS 230 then identifies an output area for the thread 1 indicated in the thread list 400, and stores the address of the common variable B and the value of the common variable B to the identified output area on the shared cache 202. When confirming that 1 is set in a writing flag for the common variable A in the output area for the thread 1, the OS 230 sets 2 in a writing flag for the common variable B in the output area for the thread 1.

Figure 11:
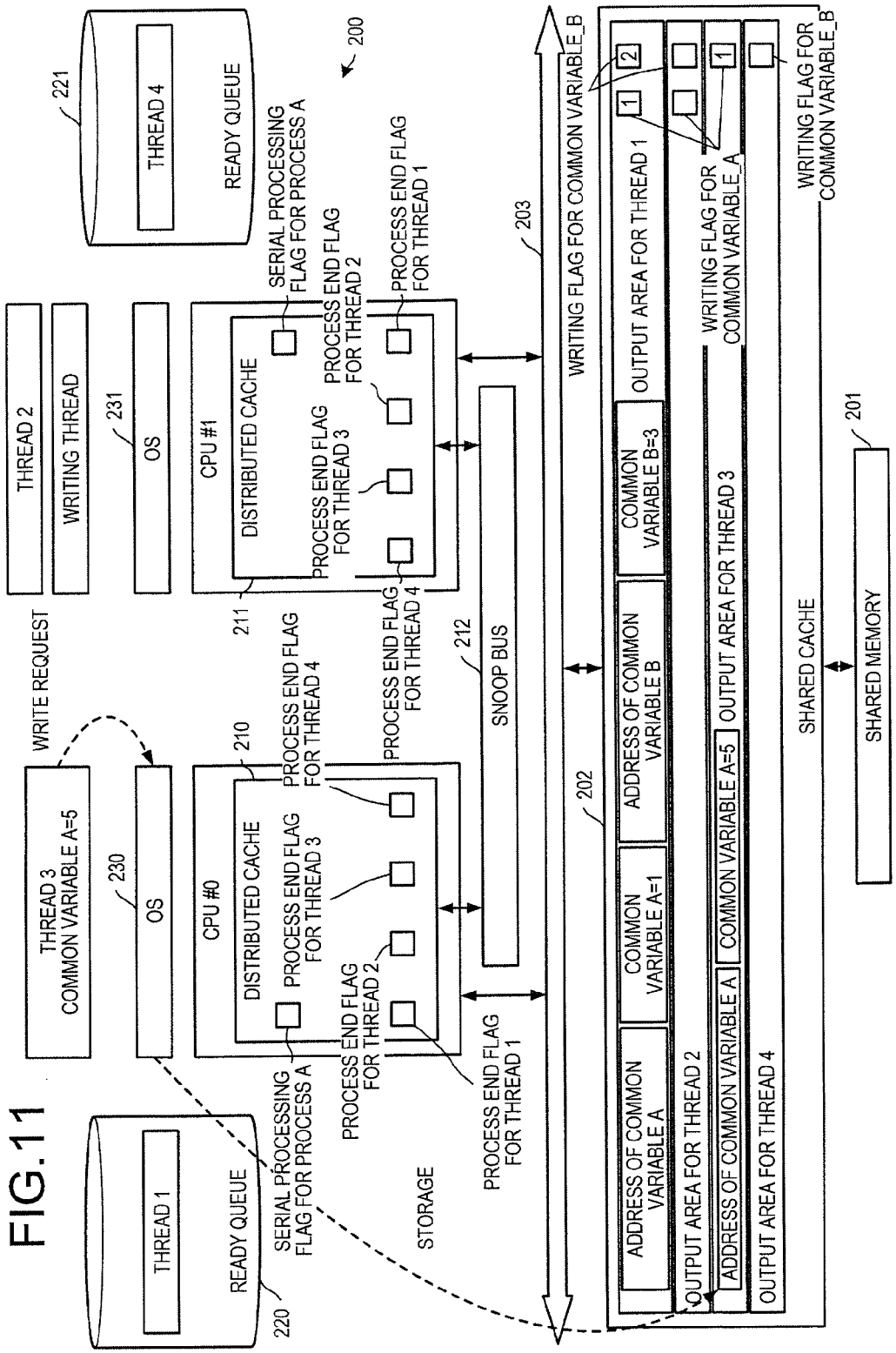
FIG. 11 is an explanatory diagram of an example of detecting a write request from the thread 3 and for writing of the common variable A.

FIG. 11 is an explanatory diagram of an example of detecting a write request from the thread 3 and for writing of the common variable A. The OS 230 detects a write request that is from the thread 3 and for writing of the common variable A. The OS 230 then identifies an output area for the thread 3 indicated in the thread list 400, and stores the address of the common variable A and the value of the common variable A to the identified output area on the shared cache 202.

Figure 12:
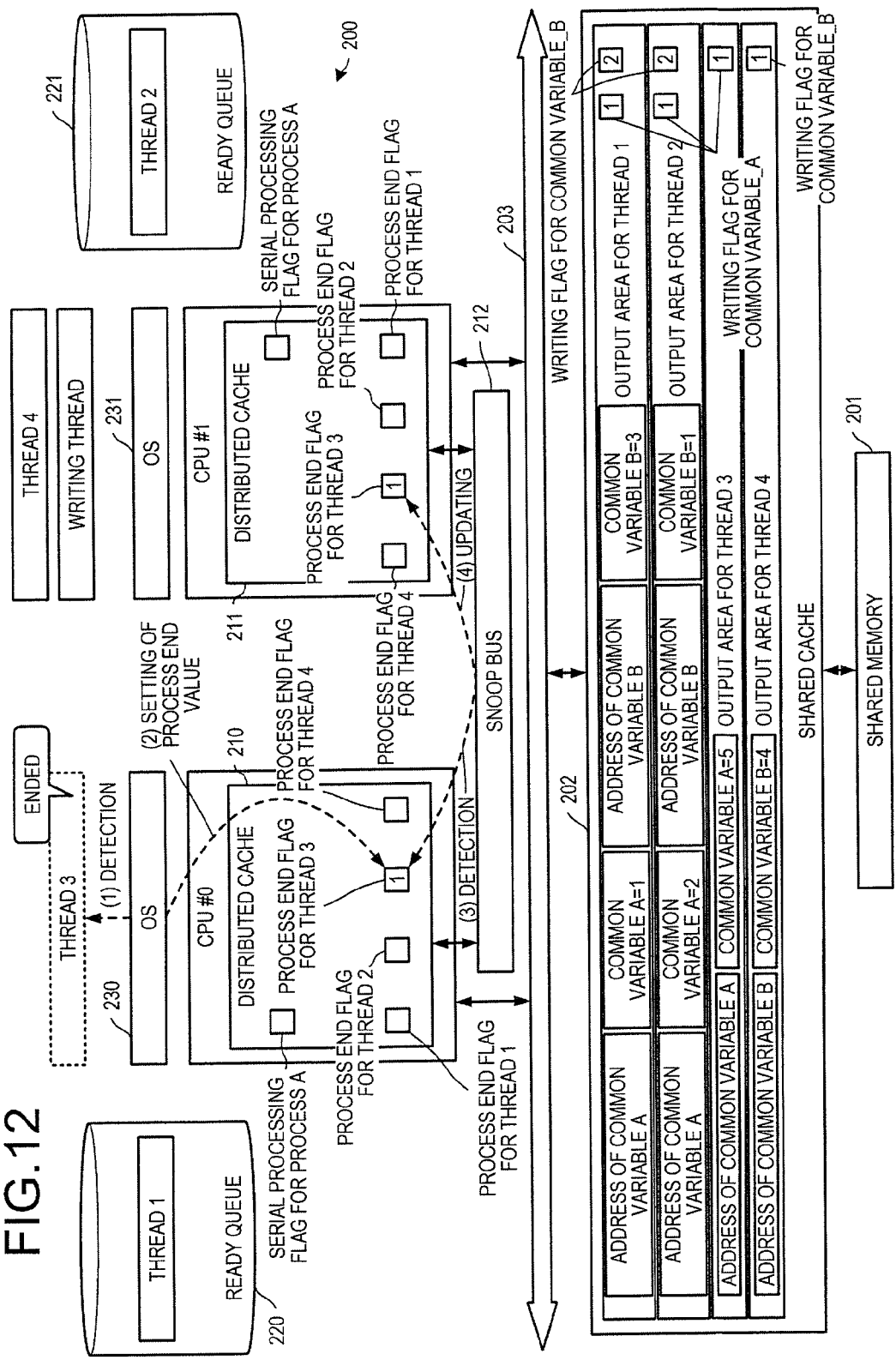
FIG. 12 is an explanatory diagram of an example of the end of the thread 3.

FIG. 12 is an explanatory diagram of an example of the end of the thread 3. In FIG. 12, a common variable of each thread is stored to each output area set for each thread on the shared cache 202. When the OS 230 (1) detects the end of the thread 3, the OS 230 (2) sets a process end flag for the thread 3 on the distributed cache 210, to 1. When the snoop bus 212 (3) detects a change in the process end flag for the thread 3 on the distributed cache 210, the snoop bus 212 (4) updates a process end flag for the thread 3 on the distributed cache 211.

Figure 13:
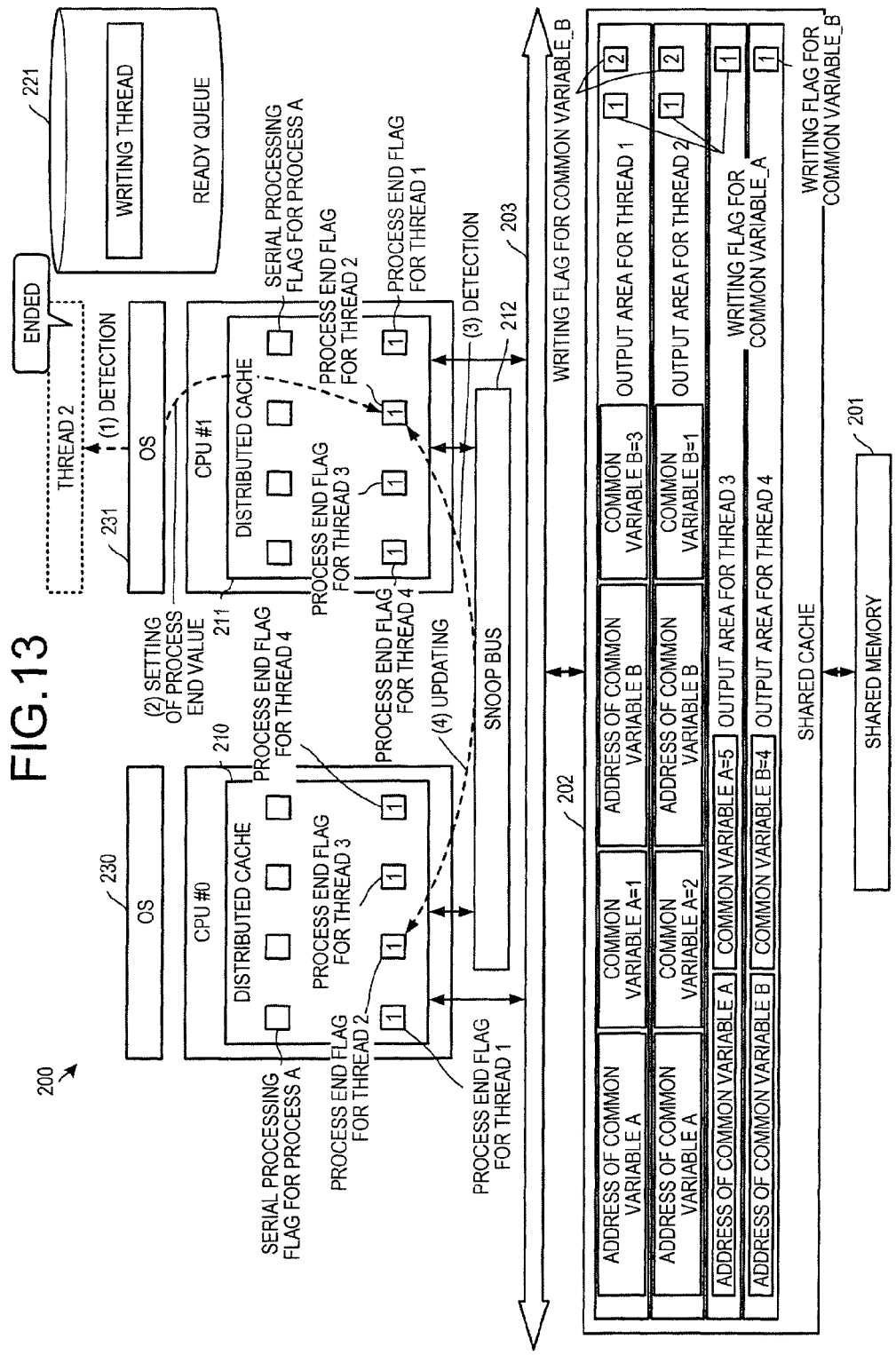
FIG. 13 is an explanatory diagram of an example of the end of the thread 2.

FIG. 13 is an explanatory diagram of an example of the end of the thread 2. In FIG. 13, execution of the threads 1, 3, and 4 has ended. When the OS 231 (1) detects the end of the thread 2, the OS 231 (2) sets a process end flag for the thread 2 on the distributed cache 211, to 1. When the snoop bus 212 (3) detects a change in the process end flag for the thread 2 on the distributed cache 211, the snoop bus 212 (4) updates a process end flag for the thread 2 on the distributed cache 210.

Figure 14:
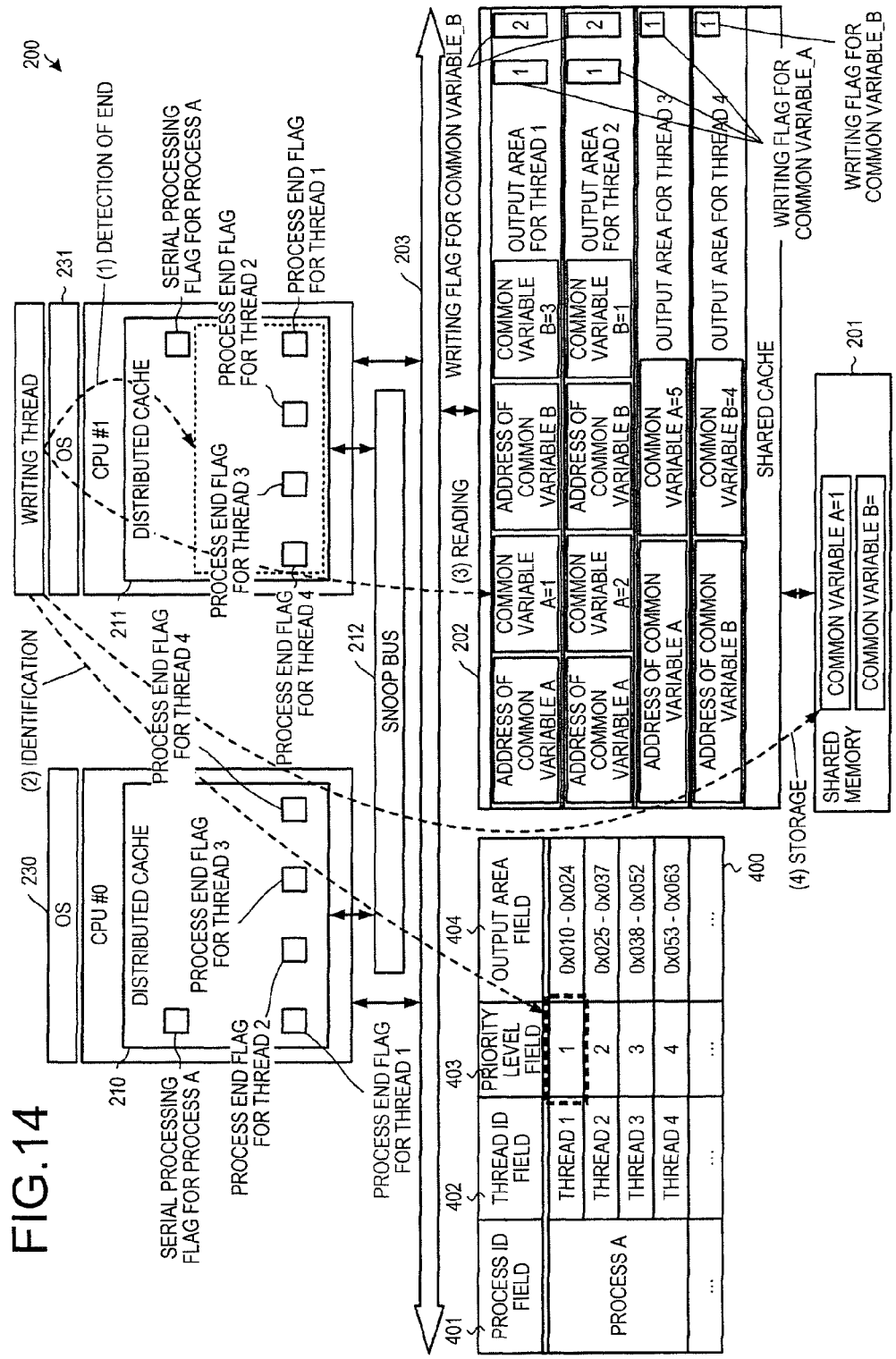
FIG. 14 is an explanatory diagram of an example of reading from a shared cache 202 and storing to shared memory 201.

FIG. 14 is an explanatory diagram of an example of reading a common variable value out of the shared cache 202 to store the common variable value to the shared memory 201. A writing thread (1) detects the end of all threads of a thread group having a common variable in the process A, based on a process end flag for each thread. The writing thread (2) identifies the priority levels of threads of the thread group defined in the process A by searching the thread list 400, and reads each value of the common variables from the shared cache 202 and respectively stores each read value to the areas for the common variables, in the shared memory 201.

For example, because a thread of the lowest priority in the process A is the thread 1, the writing thread (3) reads the value of the common variable A out of an output area for the thread 1, in the shared cache 202. The writing thread can determine whether a value in the output area for the thread 1 is a value of the common variable A or a value of the common variable B, based on the writing flags for the common variables. The writing flag for the common variable A is 1 and the writing flag for the common variable B is 2.

Hence, the writing thread confirms that in the output area, the address and the value of the common variable B are placed next to the address and the value of the common variable A. The writing thread can identify the size of each common variable by referring to the common variable information 300. In this manner, the writing thread can read out the value of the common variable A.

The writing thread then (4) stores the read value of the common variable A to an area for the common variable A in the shared memory 201. The area for the common variable A can be identified by the address of the common variable A stored together with the value of the common variable A.

Figure 15:
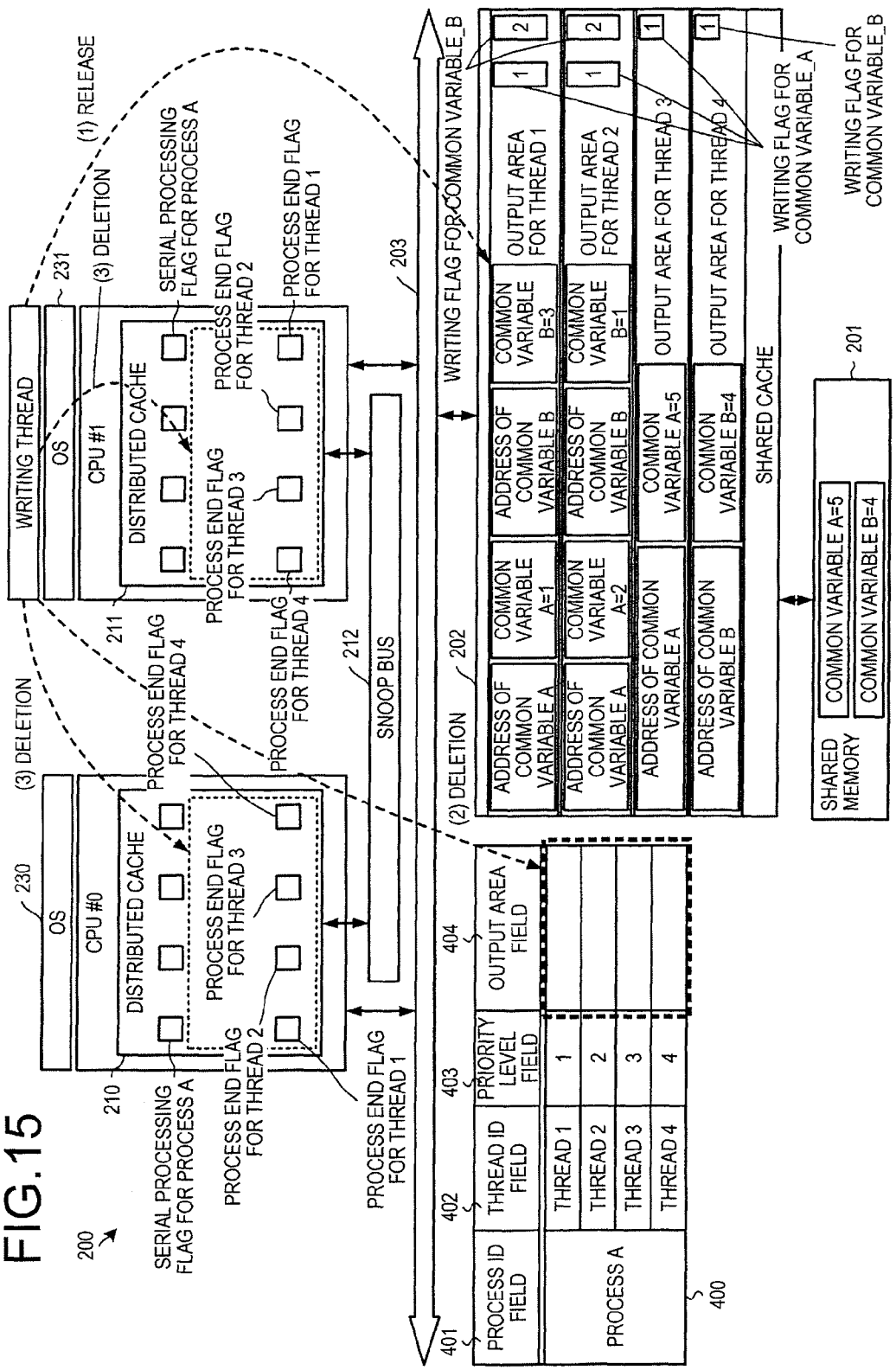
FIG. 15 is an explanatory diagram of an example of releasing an output area.

FIG. 15 is an explanatory diagram of an example of releasing an output area. In FIG. 15, a value of the common variable A in the shared memory 201 is 5, and is a value of the common variable A, the writing of which is requested by a write request from the thread 3. In FIG. 15, the value of the common variable B in the shared memory 201 is 4, and is the value of the common variable B, the writing of which is requested by a write request from the thread 4.

The writing thread (1) releases an output area for the process A set in the shared cache 202, and (2) deletes the value in the output area field for the process A from the thread list 400. The writing thread then (3) deletes process end flags for the threads 1 to 4 from respective distributed caches. When execution of all threads of a process indicated in the thread list 400 has ended, the writing thread ends the process.

An example of executing serial processing when an output area for a thread having a common variable cannot be set in the shared cache 202 will be described.

Figure 16:
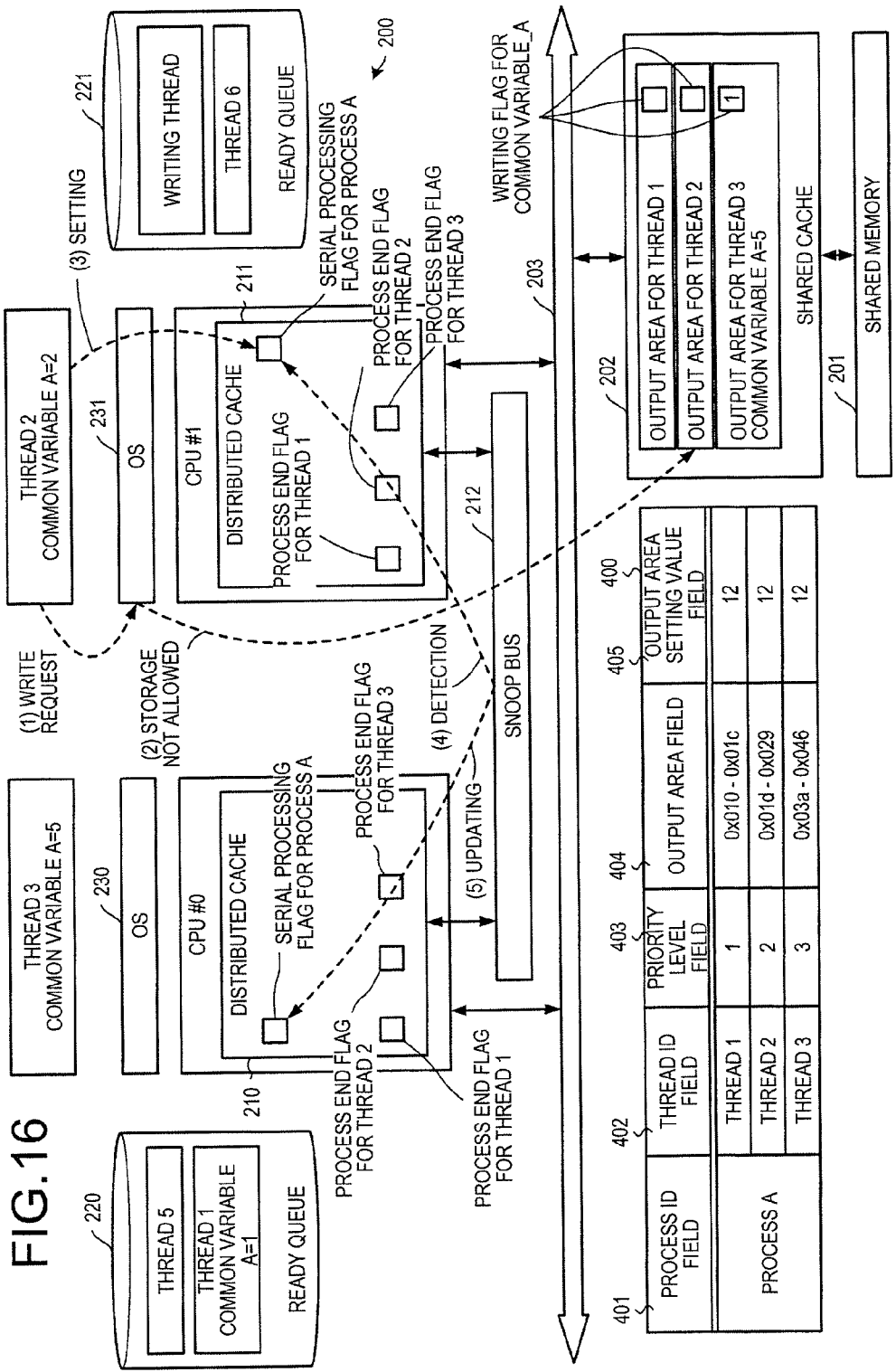
FIG. 16 is an explanatory diagram of an example in which an output area for the thread 2 is not set.

FIG. 16 is an explanatory diagram of an example in which an output area for the thread 2 is not set. This example includes only the common variable A as an example of a common variable, and is explained using the threads 1 to 3 having the common variable A and threads 5 and 6 not having any common variable. An output area setting value in the thread list 400 is, therefore, a setting value for the common variable A only. The threads 1, 3, and 5 are assigned to the CPU #0, and the threads 2 and 6 are assigned to the CPU #1. In an output area for the thread 3, the value of the common variable A is stored.

When the OS 231 (1) detects a write request that is from the thread 2 and for writing of the common variable A, the OS 231 identifies an output area for the thread 2 by searching the thread list 400. In this case, (2) the identified output area is not an area in which a value of the common variable A can be stored. The OS 231, therefore, (3) sets a serial processing flag for the process A to which the thread 2 belongs. The OS 231 can determine whether the identified output area is an area in which the value of the common variable A can be stored, by comparing the output area with an output area setting value for the thread 2.

When the snoop bus 212 (4) detects setting of the serial processing flag for the process A in the distributed cache 211, the snoop bus (5) updates a serial processing flag for the process A in the distributed cache 210.

Figure 17:
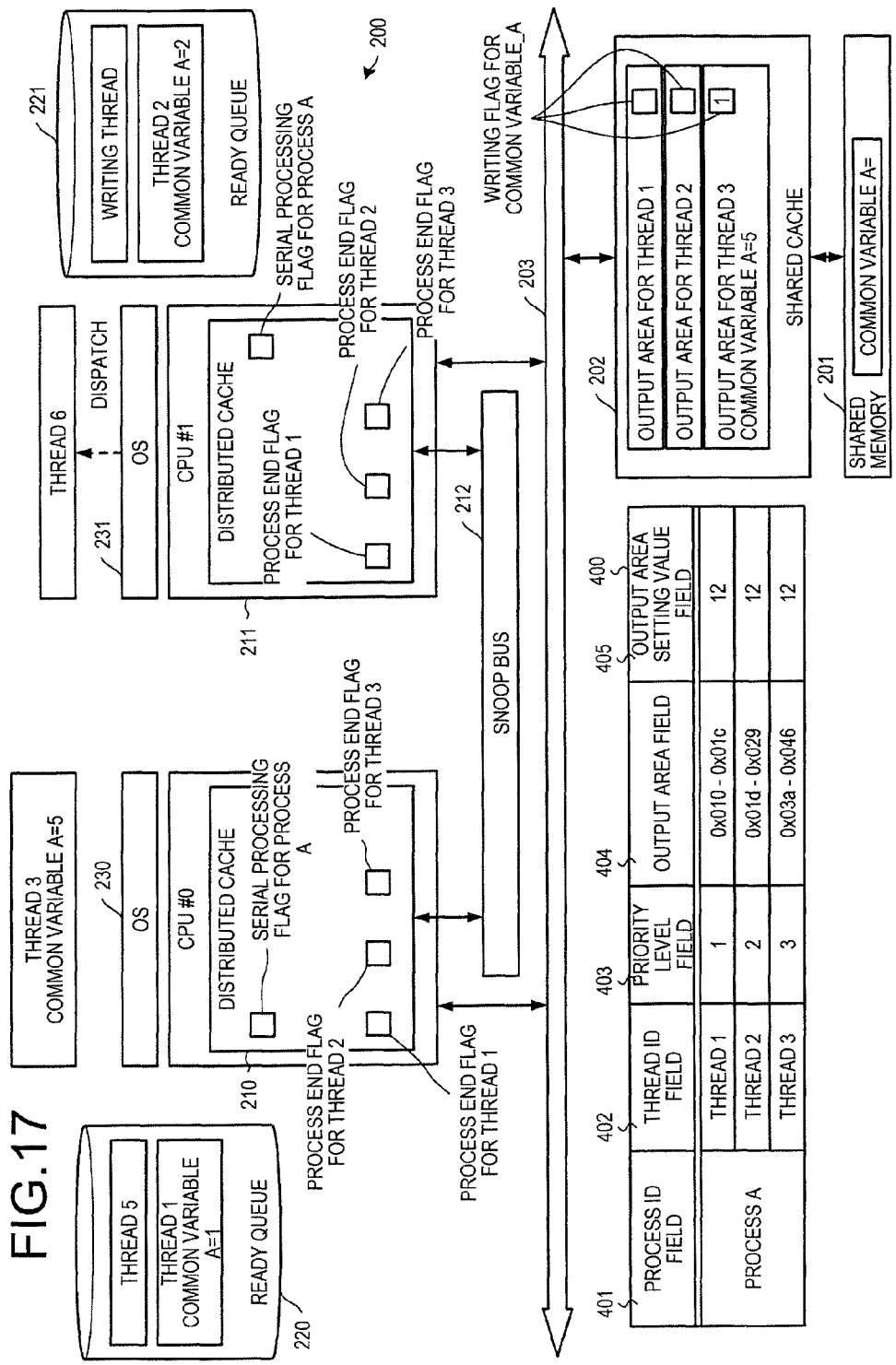
FIG. 17 is an example of switching thread dispatch, from the thread 2 to a thread 6.

FIG. 17 is an example of switching thread dispatch, from the thread 2 to the thread 6. The OS 231 identifies a thread with a priority level lower than that of the thread 2, among the threads of the process to which the thread 2 belongs. In this example, the thread 1 is identified. Because a process end flag for the thread 1 having a defined priority level lower than that of the thread 2 is not set to a process end value, the OS 231 switches the thread dispatch from the thread 2 to a thread 6 entered in the ready queue 221.

Figure 18:
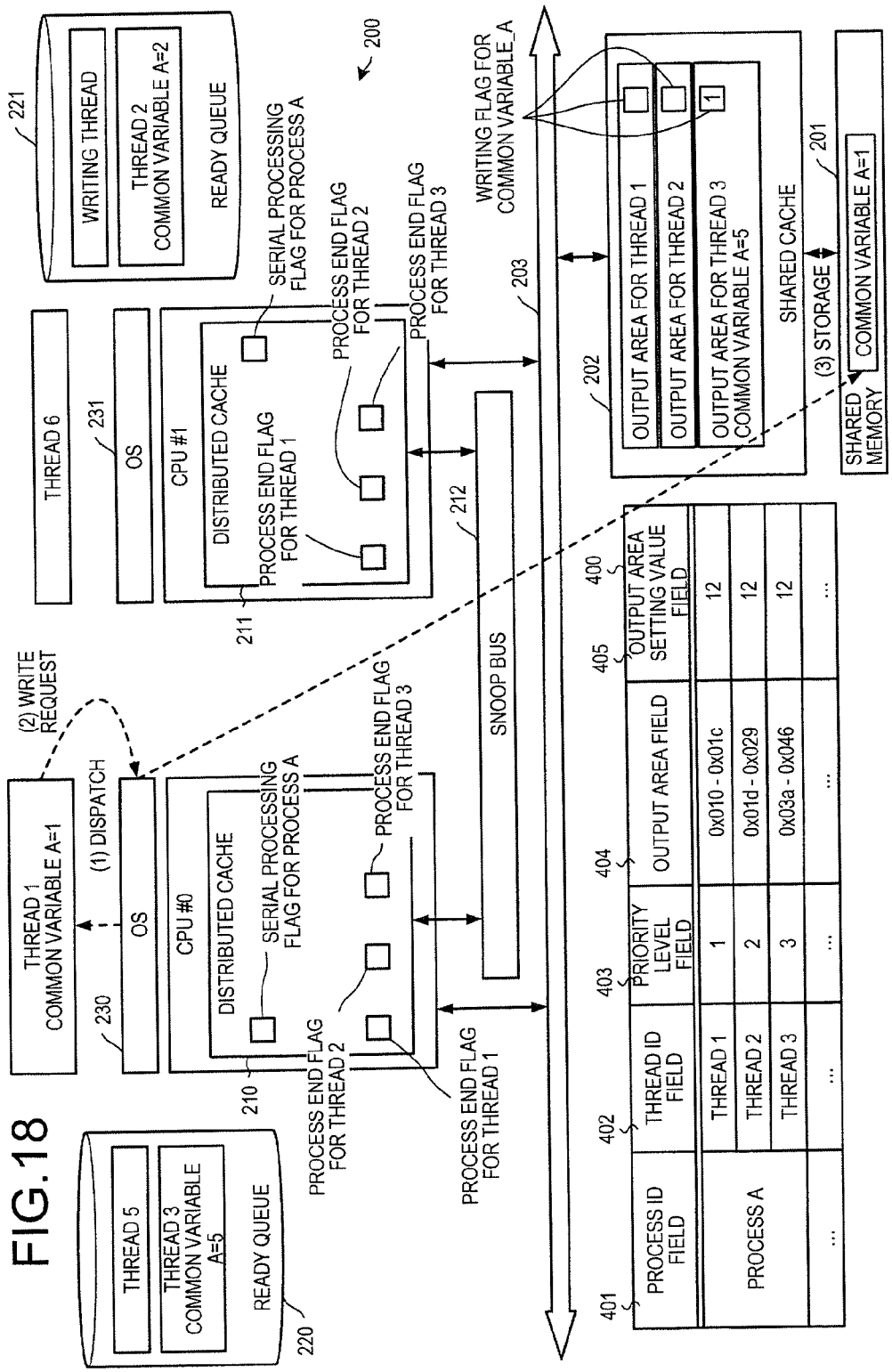
FIG. 18 is an explanatory diagram of a write request for writing of the common variable A, when a serial processing flag is set.

FIG. 18 is an explanatory diagram of a write request for writing of the common variable A, when a serial processing flag is set. The OS 230 (1) detects switching of thread dispatch from the thread 3 to the thread 1. Because a serial process flag for the process A to which the thread 1 belongs is set, the OS 230 identifies a thread with a priority level lower than that of the thread 1 among threads of the process A to which the thread 1 belongs. In this example, no thread is identified. The OS 230, therefore, executes a process of the thread 1. When the OS 230 (2) detects a write request that is from the thread 1 and for writing of the common variable A, the OS 230 (3) stores the value of the common variable A of the thread 1, to an area for the common variable A in the shared memory 201.

Figure 19:
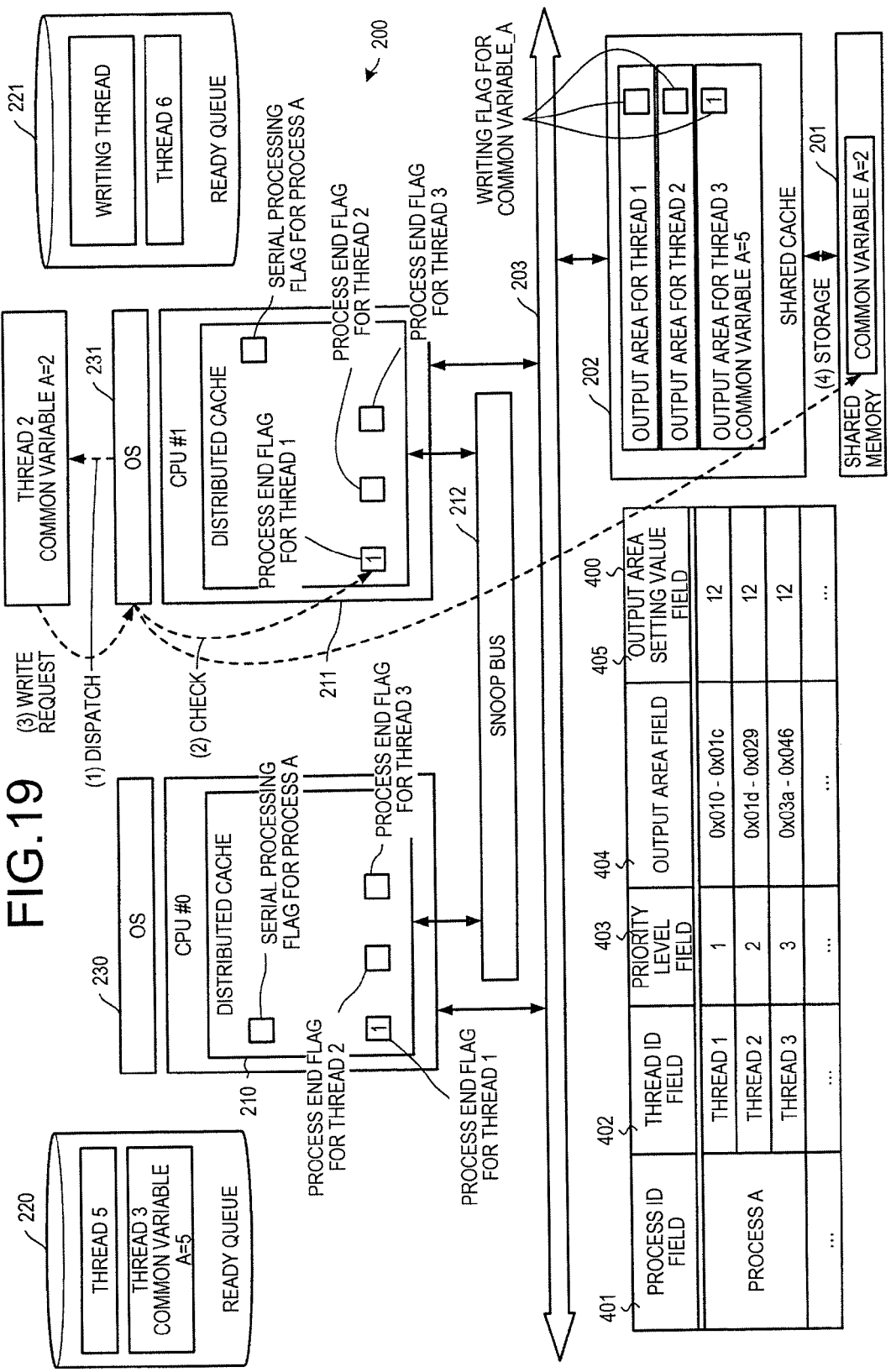
FIG. 19 is an explanatory diagram of an example of dispatching of the thread 2 after the end of a process of the thread 1.

FIG. 19 is an explanatory diagram of an example of dispatching of the thread 2 after the end of a process of the thread 1. In FIG. 19, a process end flag for the thread 1 is set, which indicates that the process of the thread 1 has ended. The OS 230 (1) detects dispatching of the thread 2. The OS 230 identifies a thread with a priority level lower than that of the thread 2, among a thread group including the common variable A of the process A to which the thread 2 belongs.

For example, the OS 231 searches the thread list 400 to identify the priority level of the thread 2. In this example, the priority level of the thread 2 is 2. The OS 231 then identifies identification information of a thread having a priority level smaller than 2, among identification information of threads identified to have identification information of the process A in the process ID field 401 by searching the thread list 400. Because the thread 1 has a priority level 1, the thread 1 is identified.

The OS 231 then (2) checks whether a process end flag for the thread 1 is set. Finding that the process end flag for the thread 1 is set, the OS 230 identifies an output area for the thread 1 by searching the thread list 400, and determines whether the value of the common variable A of the thread 1 has been stored in the output area for the thread 1, based on a writing flag for the common variable A set in the output area for the thread 1. In this example, the OS 230 determines that the value of the common variable A is not stored in the output area for the thread 1, and determines that the value of the common variable A of the thread 1 is already stored in an area for the common variable A in the shared memory 201. The OS 231 then (3) detects a write request for writing of the common variable A from the thread 2. The OS 231 thus (4) stores the value of the common variable A of the thread 2 to the area for the common variable A in the shared memory 201.

When processes of the threads 2 and 3 have ended, a writing thread reads out the value of the common variable A of the thread 3 stored in an output area for the thread 3 and stores the read value of the common variable A to the area for the common variable A in the shared memory 201.

FIG. 20 is a flowchart of an information processing procedure by the OS 230. The master OS 230 sets a serial processing flag for each process on the distributed cache of each CPU (step S2001), and determines whether a thread has been detected in the execution-waiting queue (step S2002). If determining that a thread has not been detected in the execution-waiting queue (step S2002: NO), the OS 230 returns to step S2002.

If determining that a thread has been detected in the execution-waiting queue (step S2002: YES), the OS 230 determines whether the detected thread is included in the thread list (step S2003). If determining that the detected thread is not included in the thread list (step S2003: NO), the OS 230 proceeds to step S2010.

If determining that the detected thread is included in the thread list (step S2003: YES), the OS 230 determines whether a serial processing flag for a process to which the detected thread belongs is set (step S2004). If determining that the serial processing flag for the process to which the detected thread belongs is set (step S2004: YES), the OS 230 proceeds to step S2010.

If determining that the serial processing flag for the process to which the detected thread belongs is not set (step S2004: NO), the OS 230 determines whether a writing thread is being executed at any one of the CPUs (step S2005). If determining that a writing thread is being executed at any one of the CPUs (step S2005: YES), the OS 230 proceeds to step S2007.

If determining that a writing thread is not being executed at any CPU (step S2005: NO), the OS assigns the writing thread to an arbitrary CPU (step S2006), and determines whether an output area for the detected thread is already set (step S2007). If determining that the output area for the detected thread is already set (step S2007: YES), the OS 230 proceeds to step S2010.

If determining that an output area for the detected thread is not set yet (step S2007: NO), the OS 230 sets an output area for the detected thread on the shared cache (step S2008). The OS 230 then sets an area for a process end flag for the detected thread, on the distributed cache of each CPU (step S2009), assigns the detected thread to an arbitrary CPU (step S2010), and returns to step S2002.

FIGS. 21 and 22 are flowcharts of an information processing procedure by each OS. The information processing procedure of FIGS. 21 and 22 represents a procedure of information processing executed by each CPU. The OS determines whether thread dispatching or completion of all threads has been detected (step S2101). If the OS has not detected thread dispatching or the completion of all threads (step S2101: NO), the OS returns to step S2101.

If the OS has detected thread dispatching or the completion of all threads (step S2101: DISPATCH), the OS determines whether a dispatched thread is a thread included in the thread list (step S2102). If determining that the dispatched thread is not a thread included in the thread list (step S2102: NO), the OS returns to step S2101.

If determining that the dispatched thread is a thread included in the thread list (step S2102: YES), the OS determines whether a serial processing flag for the process to which the dispatched thread belongs is set (step S2103). If determining that the serial processing flag for the process to which the dispatched thread belongs is set (step S2103: YES), the OS proceeds to step S2109.

If determining that the serial processing flag for the process to which the dispatched thread belongs is not set (step S2103: NO), the OS determines whether a write request for writing of a common variable, thread dispatching, or the end of a thread has been detected (step S2104). If the OS has not detected a write request for writing to a common variable, thread dispatching, or the end of a thread (step S2104: NO), the OS returns to the route for step S2104.

If the OS has detected thread dispatching (step S2104: DISPATCH), the OS returns to step S2102. If the OS has detected the end of a thread (step S2104: END OF THREAD), the OS sets a process end flag corresponding to the thread that has been detected to have ended, to a process end value (step S2105), and returns to step S2101.

If the OS has detected a write request for writing to a common variable (step S2104: WRITE REQUEST FOR COMMON VARIABLE), the OS determines whether a value of the common variable can be stored to an output area on the shared cache corresponding to the thread for which the write request is detected (step S2106). If the value of the common variable can be stored to the output area on the shared cache corresponding to the thread for which the write request is detected (step S2106: CAN BE STORED), the OS stores the value of the common variable to the output area corresponding to the thread (step S2107).

If the value of the common variable cannot be stored to the output area on the shared cache corresponding to the thread for which the write request is detected (step S2106: CANNOT BE STORED), the OS sets a serial processing flag (step S2108). The OS then identifies a thread having a priority level lower than that of the dispatched thread among threads of the process to which the dispatched thread belongs (step S2109).

The OS determines whether a thread having a lower priority level has been identified (step S2110). If the OS has not identified a thread having a lower priority level (step S2110: NO), the OS proceeds to step S2119. If the OS has identified a thread having a lower priority level (step S2110: YES), the OS determines whether a process end flag for each identified thread is set to a process end value (step S2111).

If the process end flag for each identified thread is not set to the process end value (step S2111: NO), the OS dispatches a different thread from the ready queue (step S2112), and returns to step S2101. If the process end flag for each identified thread is set to the process end value (step S2111: YES), the OS determines whether an unselected thread is present among the identified threads (step S2113).

If determining that an unselected thread is present (step S2113: YES), the OS selects a thread of the lowest priority out of unselected threads (step S2114). The OS then determines whether an output area corresponding to the selected thread is present on the shared cache (step S2115).

If determining that an output area corresponding to the selected thread is not present on the shared cache (step S2115: NO), the OS returns to step S2113. If determining that an output area corresponding to the selected thread is present on the shared cache (step S2115: YES), the OS reads out the value of the common variable stored in the output area corresponding to the selected thread and stores the read value of the common variable to the area for the common variable in the shared memory (step S2116).

The OS releases the output area corresponding to the selected thread (step S2117), deletes output area information concerning the selected thread from the thread list (step S2118), and returns to step S2113.

If determining at step S2113 that an unselected thread is not present (step S2113: NO), the OS executes a process of the dispatched thread (step S2119). The OS then determines whether the end of the process of the dispatched thread or thread dispatching has been detected (step S2120).

If the OS has not detected the end of the process of the dispatched thread or thread dispatching (step S2120: NO), the OS returns to the route for step S2120. If the OS has detected thread dispatching (step S2120: DISPATCH), the OS returns to step S2102. If the OS has detected the end of the process of the dispatched thread (step S2120: END OF PROCESS OF THREAD), the OS sets the process end flag corresponding to the dispatched thread, to a writing completion value (step S2121), and returns to step S2101.

If the OS determines at step S2101 that the end of the process of each thread has been detected (step S2101: END OF PROCESS), the OS ends the series of operations.

FIGS. 23 and 24 are flowcharts of an information processing procedure by a writing thread. The writing thread determines whether a process for which a serial processing flag is set is present among processes in the thread list (step S2301). If determining that a process for which a serial processing flag is set is present among processes in the thread list (step S2301: YES), the writing thread determines whether an unselected process is present among processes for which serial processing flags are set (step S2302).

If determining that an unselected process is present (step S2302: YES), the writing thread selects an arbitrary process from among the unselected processes among the processes for which the serial processing flags are set (step S2303). The writing thread then determines whether an unselected thread is present among a thread group that includes a common variable of the selected process (step S2304). If determining that an unselected thread is not present (step S2304: NO), the writing thread returns to step S2302.

If determining that an unselected thread is present (step S2304: YES), the writing thread selects a thread of the lowest priority among unselected threads (step S2305). The writing thread then determines whether a process end flag for the selected thread is set to a process end value (step S2306).

If determining that the process end flag for the selected thread is not set to the process end value (step S2306: NO), the OS returns to step S2302. If determining that the process end flag for the selected thread is set to the process end value (step S2306: YES), the writing thread reads out the value of the common variable stored in an output area corresponding to the selected thread and stores the read value of the common variable to an area for the common variable in the shared memory (step S2307).

The writing thread then releases the output area corresponding to the selected thread (step S2308), deletes output area information concerning the selected thread from the thread list (step S2309), and returns to step S2304.

At step S2302, if the writing thread determines that an unselected thread is not present among processes for which serial processing flags are set (step S2302: NO), the writing thread proceeds to step S2317.

At step S2301, if the writing thread determines that a process for which a serial processing flag is set is not present (step S2301: NO), the writing thread determines whether among the processes in the thread list, a process having a process end flag for each thread of a thread group that includes a common variable, being set to a process end value is present (step S2310). If determining that a process having a process end flag for each thread being set to a process end value is not present (step S2310: NO), the writing thread returns to step S2301.

If determining that a process having a process end flag for each thread being set to a process end value is present (step S2310: YES), the writing thread determines whether an unselected process is present among processes having a process end flag for each thread being set to a process end value (step S2311). If the writing thread determines that an unselected process is present (step S2311: YES), the writing thread selects an arbitrary process from among the unselected processes (step S2312). The writing thread reads out the value of the common variable stored in an output area corresponding to the selected process and stores the read value of the common variable to an area for the common variable in the shared memory (step S2318)

The writing thread then releases output areas corresponding to each thread of the thread group including a common variable, of the selected process (step S2313), and deletes from the thread list, output area information concerning the threads of the selected process (step S2314).

The writing thread then resets a serial processing flag for the selected process (step S2315), releases each process end flag for each thread of the thread group including the common variable of the selected process (step S2316), and returns to step S2311. If determining that an unselected process is not present (step S2311: NO), the writing thread determines whether all threads of each process in the thread list have ended (step S2317).

If determining that not all threads of each process in the thread list have ended (step S2317: NO), the writing thread returns to step S2301. If determining that all threads of each process in the thread list have ended (step S2317: YES), the writing thread ends the series of operations.

As described above, according to the information processing apparatus, the information processing program, and the information processing method, the value of the common variable of each thread among a thread group that has the common variable and is in a given process, is stored in a different area, respectively. After each thread of the thread group has ended, the value in a specific storage location is overwritten with the values of the common variables in the order of threads of the thread group defined in the given process. Even if the order of execution of threads of the thread group is different from the order of execution of threads of the defined thread group, a case where the final value of the common variable varies consequent a change in the execution order of the threads can be prevented. Hence, throughput and execution efficiency are improved.

If a storage location for the value of a common variable of a given thread of the thread group cannot be set and execution of a thread that is executed earlier than the given thread has ended, the value of the common variable of the given thread is stored to the specific storage location, thereby allowing values of the common variable to be stored in the specific storage location in the order of execution.

If a storage location for the value of a common variable of a given thread of the thread group cannot be set and execution of a thread that is executed earlier than the given thread has not ended, the value of the common variable of the given thread is not stored to the specific storage location, and the thread to be executed is changed from the given thread to a different thread, thereby preventing storage of values of the common variable to the specific storage location in the order of execution of threads of the thread group, when the order of execution is different from the order of storage of the values of the common variable.

The information processing apparatus, the information processing program, and the information processing method offer an effect of improving throughput and execution efficiency.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising a computer configured to:
    set for N threads to be executed in a given order in a given process, N storage locations for N values of a common variable of the N threads, respectively, where N is a positive integer;
    execute the N threads in an order different from the given order;
    store the N values of the common variable that are obtained by executing the N threads to the N storage locations set for the N threads, respectively; and
    read out in the given order and upon completion of execution of all of the N threads, the N values of the common variable from the N storage locations and write the N values into a specific storage location in the given order such that an i-th value for an i-th thread is overwritten by an (i+1)-th value for an (i+1)-th thread, where i is a positive integer from 1 to (N−1),
    wherein the computer, when a size of a j-th value of the common variable is greater than a size of a j-th storage location set for a j-th thread, stores the j-th value to the specific storage location if execution of all of (j−1) threads to be executed in the given order before the j-th thread has been completed, where j is a positive integer from 1 to N.

2. The information processing apparatus according to claim 1, wherein
    the computer, when the size of the j-th value of the common variable is greater than the size of the i-th storage location set for the j-th thread and when the execution of all of (j−1) threads to be executed before the j-th thread has not been completed, does not store the j-th value to the specific storage location, and
    switches execution from the j-th thread to a different thread among the N threads.

3. A non-transitory computer-readable recording medium storing an information processing program that causes a computer to execute a process comprising:
    setting for N threads to be executed in a given order in a given process, N storage location locations for N values of a common variable of the N threads, respectively, where N is a positive integer;
    executing the N threads in an order different from the given order;

storing the N values of the common variable that are obtained by executing the N threads to the N storage locations set for the N threads, respectively; and reading out in the given order and upon completion of execution of all of the N threads, the N values of the common variable from the N storage locations and write the N values into a specific storage location in the given order such that an i-th value for an i-th thread is overwritten by an (i+1)-th value for an (i+1)-th thread, where i is a positive integer from 1 to (N−1), wherein the computer, when a size of a j-th value of the common variable is greater than a size of a j-th storage location set for a j-th thread, stores the j-th value to the specific storage location if execution of all of (j−1) threads to be executed in the given order before the j-th thread has been completed, where j is a positive integer from 1 to N.

4. An information processing method executed by a computer, the information processing method comprising:

setting for N threads to be executed in a given order in a given process, N storage locations for N values of a common variable of the N threads, respectively, where N is a positive integer;

executing the N threads in an order different from the given order;

storing the N values of the common variable that are obtained by executing the N threads to the N storage locations set for the N threads, respectively; and reading out in the given order and upon completion of execution of all of the N threads, the N values of the common variable from the N storage locations and write the N values into a specific storage location in the given order such that an i-th value for an i-th thread is overwritten by an (i+1)-th value for an (i+1)-th thread, where i is a positive integer from 1 to (N−1), wherein the computer, when a size of a j-th value of the common variable is greater than a size of a j-th storage location set for a j-th thread, stores the j-th value to the specific storage location if execution of all of (j−1) threads to be executed in the given order before the j-th thread has been completed, where j is a positive integer from 1 to N.

* * * * *